(12) United States Patent
Chen et al.

(10) Patent No.: US 12,717,976 B2
(45) Date of Patent: Aug. 25, 2026

(54) CONTROL CIRCUIT, ELECTRONIC DEVICE, HARDWARE SECURITY PROTECTION METHOD, AND STORAGE MEDIUM

(71) Applicant: Honor Device Co., Ltd., Shenzhen (CN)

(72) Inventors: Wenlong Chen, Shenzhen (CN); Xutong Deng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 295 days.

(21) Appl. No.: 18/708,106

(22) PCT Filed: Apr. 13, 2023

(86) PCT No.: PCT/CN2023/088069

§ 371 (c)(1),
(2) Date: May 7, 2024

(87) PCT Pub. No.: WO2023/236650

PCT Pub. Date: Dec. 14, 2023

(65) Prior Publication Data

US 2026/0170186 A1 Jun. 18, 2026

(30) Foreign Application Priority Data

Jun. 7, 2022 (CN) ........................ 202210633372.2

(51) Int. Cl.
*G06F 21/81* (2013.01)
*G06F 3/16* (2006.01)
(Continued)

(52) U.S. Cl.
CPC .............. *G06F 21/81* (2013.01); *G06F 3/162* (2013.01); *G06F 13/4068* (2013.01); *H04M 1/72403* (2021.01); *H04M 1/72466* (2021.01)

(58) Field of Classification Search
None
See application file for complete search history.

(56) References Cited

U.S. PATENT DOCUMENTS 8,090,961 B2 * 1/2012 Yoffe ...................... G06F 21/82 713/153
8,522,309 B2 * 8/2013 Yoffe ...................... G06F 21/70 713/165
(Continued)

FOREIGN PATENT DOCUMENTS

CN 1933632 A 3/2007
CN 108363476 A 8/2018
(Continued)

OTHER PUBLICATIONS

Machine Translation of Chinese Patent CN 220983884 U, published May 17, 2024. (Year: 2024).*
(Continued)

*Primary Examiner* — Steven G Snyder
(74) *Attorney, Agent, or Firm* — Slater Matsil, LLP

(57) ABSTRACT

This application provides a control circuit, an electronic device, a hardware security protection method, and a storage medium. The control circuit includes: a MCU, a short circuit element, a switch element, and an input/output unit, where a VCC pin of the MCU is connected to a power supply voltage VCC, a GPIO pin of the MCU is connected to an input end of the short circuit element, a GND pin of the MCU is grounded through the switch element, and an output end of the short circuit element is connected to a signal receiving end of the input/output unit; the MCU is configured to output a first control signal through the GPIO pin after the GND pin is grounded through the switch element; and the short circuit element is configured to control, based on the first control signal, the input/output unit to be short-circuited to ground.

20 Claims, 9 Drawing Sheets

(51) Int. Cl.

| | |
|---|---|
| ***G06F 13/40*** | (2006.01) |
| ***H04M 1/72*** | (2021.01) |
| ***H04M 1/72403*** | (2021.01) |
| ***H04M 1/72466*** | (2021.01) |

(56) References Cited

U.S. PATENT DOCUMENTS

| | | | | |
|---|---|---|---|---|
| 8,924,708 | B2 * | 12/2014 | Yoffe | G06F 21/85 713/152 |
| 10,915,484 | B2 * | 2/2021 | Nevalainen | G06F 21/82 |
| 2006/0248257 | A1 * | 11/2006 | Kojima | G06F 1/266 710/316 |
| 2009/0144571 | A1 * | 6/2009 | Tatsumi | G06F 1/3287 713/320 |
| 2011/0109371 | A1 * | 5/2011 | Kastl | G06F 1/3203 710/316 |
| 2014/0015673 | A1 | 1/2014 | Soffer | |
| 2018/0246832 | A1 | 8/2018 | Nevalainen et al. | |
| 2021/0397728 | A1 | 12/2021 | Thomson et al. | |

FOREIGN PATENT DOCUMENTS

| | | | |
|---|---|---|---|
| CN | 110191465 | A | 8/2019 |
| CN | 111781545 | A | 10/2020 |
| CN | 112307523 | A | 2/2021 |
| CN | 113206914 | A | 8/2021 |
| CN | 114325473 | A | 4/2022 |
| CN | 114498804 | A | 5/2022 |
| EP | 3061040 | A1 | 8/2016 |
| WO | 2015058876 | A1 | 4/2015 |

OTHER PUBLICATIONS

"Hard, NOT Soft, Kill Switches" by Purism, Sep. 21, 2015. (Year: 2015).*

"This smartphone has physical kill switches for its cameras, microphone, data, Bluetooth, and Wi-Fi" by Android Police, Aug. 22, 2020. (Year: 2020).*

* cited by examiner

CONTROL CIRCUIT, ELECTRONIC DEVICE, HARDWARE SECURITY PROTECTION METHOD, AND STORAGE MEDIUM

CROSS-REFERENCE TO RELATED APPLICATIONS

This application is a national stage of International Application No. PCT/CN2023/088069, filed on Apr. 13, 2023, which claims priority to Chinese Patent Application No. 202210633372.2, filed on Jun. 7, 2022. The disclosures of both of the aforementioned applications are hereby incorporated by reference in their entireties.

TECHNICAL FIELD

This application relates to the technical field of electronic information, and in particular, to a control circuit, an electronic device, a hardware security protection method, and a storage medium.

BACKGROUND

With the continuous development of electronic information technologies, various electronic devices appear in our life, and our lives rely more on the electronic devices. Therefore, security of the electronic devices attracts more and more attention. Using a mobile phone as an example, a user of the mobile phone is increasingly concerned about personal privacy issues. However, most Android users currently do not know which hardware device permissions, such as permissions to use a camera and a microphone, are obtained by an Android application program package (Android application program package, APK) installed in the mobile phone. When the user does not know which device permissions are obtained by the APK installed on the mobile phone, the permissions cannot be disabled in time.

In addition, some third-party APKs cannot be installed and used if the third-party APKs do not agree to permissions to use some hardware devices, such as a camera and a microphone, the user is forced to agree. Furthermore, after the third-party APK is installed, whether during use or in a standby state, private information of the user can be obtained through the hardware devices that grant permissions to use.

SUMMARY

To resolve the foregoing technical problems, this application provides a control circuit, an electronic device, a hardware security protection method, and a storage medium, which aims to control hardware devices that can obtain private user information, so that the hardware devices are selectively in a failure state, to prevent a third-party APK from excessively collecting user information in terms of hardware, thereby improving the security of usage of the electronic device.

According to a first aspect, this application provides a control circuit. The control circuit includes: a micro control unit MCU, a short circuit element, a switch element, and an input/output unit, where a VCC pin of the MCU is connected to a power supply voltage VCC, a GPIO pin of the MCU is connected to an input end of the short circuit element, a GND pin of the MCU is grounded through the switch element, and an output end of the short circuit element is connected to a signal receiving end of the input/output unit; the MCU is configured to output a first control signal through the GPIO pin after the GND pin is grounded through the switch element; and the short circuit element is configured to control, based on the first control signal, the input/output unit to be short-circuited to ground.

Therefore, the short circuit element is set for the input/output unit that can output the private user information, and the short circuit element is controlled to perform short circuit on the input/output unit through the first control signal outputted by the GPIO pin of the MCU, so that the input/output unit can be selectively controlled to be in the failure state, that is, the third-party APK can be prevented from excessive collecting user information in terms of hardware, thereby improving the security of the usage of the electronic device.

According to the first aspect, the control circuit further includes a processing unit CPU. The CPU communicates with the MCU through an I2C bus, where the MCU is further configured to output a third control signal through the GPIO pin after receiving a second control signal transmitted by the CPU through the I2C bus; and the short circuit element is further configured to control, based on the third control signal, the input/output unit to be turned on. Therefore, the MCU can determine which failed input/output units should be restored for normal use based on the second control signal transmitted by the CPU, thereby ensuring normal use of the input/output units by the user.

According to the first aspect or any one of the foregoing implementations in the first aspect, a clock signal port of the CPU is connected to the signal receiving end of the input/output unit, where after the input/output unit is turned on, the input/output unit receives a clock signal transmitted by the CPU through the clock signal port and responds to the clock signal. Therefore, after the input/output unit is turned on, the CPU may communicate with the input/output unit through the clock signal port, to obtain the required data from the input/output unit.

According to the first aspect or any one of the foregoing implementations in the first aspect, the input/output unit includes any one or more of the following: a camera unit, a microphone unit, a storage unit, and a sensor unit. Therefore, input/output units such as the camera unit, the microphone unit, the storage unit, and the sensor unit may be selectively failed, thereby preventing a third-party APK from calling the input/output units in a background to collect user privacy.

According to the first aspect or any one of the foregoing implementations in the first aspect, a quantity of the short circuit elements and a quantity of the input/output units are the same, and in a one-to-one correspondence. Therefore, by controlling on and off of different short circuit elements, so that different input/output units may be selectively failed.

According to the first aspect or any one of the foregoing implementations in the first aspect, one GPIO pin of the MCU is respectively connected to the input end of each short circuit element. Therefore, short circuit control of all input/output units may be implemented through the one GPIO pin of the MCU. The circuit is simple in structure and is convenient to implement.

According to the first aspect or any one of the foregoing implementations in the first aspect, a quantity of the GPIO pins of the MCU and a quantity of the short circuit elements are the same, and in a one-to-one correspondence. Therefore, short circuit control of different input/output units is implemented through different GPIO pins of the MCU, so that some input/output units may be selectively failed to better adapt to different usage scenarios and user requirements.

According to the first aspect or any one of the foregoing implementations in the first aspect, when the input/output unit includes a microphone unit, the control circuit further includes: a codec, where a positive input end of the codec is connected to a positive output end of the microphone unit, a negative input end of the codec is connected to a negative output end of the microphone, and a positive input end of the microphone unit is a signal receiving end and is connected to the output end of the short circuit element.

According to the first aspect or any one of the foregoing implementations in the first aspect, the short circuit element is a metal-oxide-semiconductor field-effect MOS transistor. In this way, a circuit size may be reduced as much as possible and power consumption of the electronic device may be reduced.

According to the first aspect or any one of the foregoing implementations in the first aspect, the MOS transistor is an NMOS transistor; a gate of the NMOS transistor is grounded, a drain of the NMOS transistor is an input end and is connected to the GPIO pin of the MCU, and a source of the NMOS transistor is an output end and is connected to the signal receiving end of the input/output unit; and when the MOS transistor is the NMOS transistor, the first control signal is a high-level signal, and the NMOS transistor is turned on in response to the high-level signal, so that the input/output unit is short-circuited to ground.

According to the first aspect or any one of the foregoing implementations in the first aspect, the MOS transistor is a PMOS transistor; a gate of the PMOS transistor is grounded, a source of the PMOS transistor is an input end and is connected to the GPIO pin of the MCU, and a drain of the PMOS transistor is an output end and is connected to the signal receiving end of the input/output unit; and when the MOS transistor is the PMOS transistor, the first control signal is a low-level signal, and the PMOS transistor is turned on in response to the low-level signal, so that the input/output unit is short-circuited to ground.

According to a second aspect, this application provides an electronic device. The electronic includes the control circuit according to the first aspect or any possible implementation of the first aspect, and has all effects of the control circuit according to the first aspect or any possible implementation of the first aspect.

According to a third aspect, this application provides a hardware security protection method, applied to the electronic device according to the second aspect. The method includes: determining that a first operation instruction for enabling a hardware security protection mode is received; controlling, based on the first operation instruction, the switch element to be turned off, so that the GND pin of the micro control unit MCU is grounded; after the GND pin is grounded, outputting, by the MCU, a first control signal through the GPIO pin; and controlling, by the short circuit element based on the first control signal, the input/output unit to be short-circuited to ground. Therefore, the short circuit element is set for the input/output unit that can output the private user information, and the short circuit element is controlled to perform short circuit on the input/output unit through the first control signal outputted by the GPIO pin of the MCU, so that the input/output unit can be selectively controlled to be in the failure state, that is, the third-party APK can be prevented from excessive collecting user information in terms of hardware, thereby improving the security of the usage of the electronic device.

According to the third aspect, determining that a first operation instruction for enabling a hardware security protection mode is received includes: monitoring an on/off state corresponding to a first mechanical button; and when the on/off state is a first state, determining that a first operation instruction for triggering to enable the hardware security protection mode is received, where the first state is used for indicating that the first mechanical button is currently at an off position.

According to the third aspect or any one of the foregoing implementations in the third aspect, after the controlling a switch element to be turned off based on the first operation instruction, so that a GND pin of a micro control unit MCU is grounded, the method further includes: when the on/off state changes from the first state to a second state, determining that a second operation instruction for disabling the hardware security protection mode is received, where the second state is used for indicating that the first mechanical button is currently at an on position, and the second operation instruction is used for controlling the switch element to be turned on, so that the GND pin is not grounded, and the hardware security protection mode is disabled.

Therefore, an implementation of enabling or disabling the hardware security protection mode through the mechanical button is provided. In an entire process, a user only needs to control an on/off state of the first mechanical button to quickly enable or disable the hardware security protection mode, which is convenient for the user to operate.

According to the third aspect or any one of the foregoing implementations in the third aspect, determining that a first operation instruction for enabling a hardware security protection mode is received includes: recording, when a first press operation on a second mechanical button is detected, first press duration on the second mechanical button; and determining, when the first press duration matches a first time threshold, that the first operation instruction for enabling the hardware security protection mode is received.

According to the third aspect or any one of the foregoing implementations in the third aspect, after the controlling a switch element to be turned off based on the first operation instruction, so that a GND pin of a micro control unit MCU is grounded, the method further includes: recording, when a second press operation on the second mechanical button is detected, second press duration on the second mechanical button; and determining, when the second press duration matches a second time threshold, that a second operation instruction for disabling the hardware security protection mode is received, where the second operation instruction is used for controlling the switch element to be turned on, so that the GND pin is not grounded and the hardware security protection mode is disabled.

Therefore, an implementation of enabling or disabling the hardware security protection mode through the mechanical button is provided. In an entire process, a user only needs to long press a certain mechanical button for a specific time to quickly enable or disable the hardware security protection mode, which is convenient for the user to operate.

According to the third aspect or any one of the foregoing implementations in the third aspect, determining that a first operation instruction for enabling a hardware security protection mode is received includes: recording, when a third press operation on a second mechanical button is detected, a quantity of times of first press on the second mechanical button within a set time; and determining, when the quantity of times of first press matches a first quantity of times threshold, that the first operation instruction for enabling the hardware security protection mode is received.

According to the third aspect or any one of the foregoing implementations in the third aspect, after the controlling a switch element to be turned off based on the first operation instruction, so that a GND pin of a micro control unit MCU is grounded, the method further includes: recording, when a fourth press operation on the second mechanical button is detected, the quantity of times of first press on the second mechanical button within the set time; and determining, when a quantity of times of second press matches a second quantity of times threshold, that a second operation instruction for disabling the hardware security protection mode is received, where the second operation instruction is used for controlling the switch element to be turned on, so that the GND pin is not grounded and the hardware security protection mode is disabled.

Therefore, an implementation of enabling or disabling the hardware security protection mode through the mechanical button is provided. In an entire process, a user only needs to press a specific quantity of times for a certain mechanical button to quickly enable or disable the hardware security protection mode, which is convenient for the user to operate.

According to the third aspect or any one of the foregoing implementations in the third aspect, after the controlling, by a short circuit element based on the first control signal, an input/output unit to be short-circuited to ground, the method further includes: obtaining, by a processing unit CPU when receiving an access request to access the input/output unit, description information of an application program that accesses the input/output unit, where the description information is used for determining whether the application program is a system application; sending, by the CPU, a second control signal to the MCU through an I2C bus when it is determined, based on the description information, that the application program is the system application; outputting, by the MCU after receiving the second control signal, a third control signal through the GPIO pin; and controlling, by the short circuit element based on the third control signal, the input/output unit to be turned on. Therefore, the MCU can determine which failed input/output units should be restored for normal use based on the second control signal transmitted by the CPU, thereby ensuring normal use of the input/output units by the user.

According to a fourth aspect, this application provides a hardware security protection method, applied to the electronic device according to the second aspect. An application program for enabling a hardware security protection mode is installed in the electronic device, the application program provides a first control for enabling the hardware security protection mode and a second control for disabling the hardware security protection mode, and the method includes: determining, when a click operation on the first control is detected, that a first operation instruction for enabling the hardware security protection mode is received; and controlling, based on the first operation instruction, the switch element to be turned off, so that the GND pin of the micro control unit MCU is grounded.

Therefore, the hardware security protection mode is enabled through software.

According to the fourth aspect, after the GND pin is grounded, the method further includes: outputting, by the MCU, a first control signal through the GPIO pin.

Therefore, after a switch is controlled to be disabled, the first control signal is directly outputted, and short circuit of the input/output unit may be immediately implemented.

According to the fourth aspect or any one of the foregoing implementations in the fourth aspect, after a click operation on the first control is detected, the method further includes: displaying, by the application program, a first interface in response to the click operation on the first control, where the first interface includes a third control indicating the input/output unit; performing a third operation on the third control; and outputting, by the MCU in response to the third operation, a first control signal to the short circuit element corresponding to the input/output unit through the GPIO pin.

Therefore, after the switch is controlled to be disabled, user operation of the first interface is provided, and then whether to output the first control signal is determined based on the user operation, so that short circuit of the input/output unit may be triggered based on user requirements.

According to the fourth aspect or any one of the foregoing implementations in the fourth aspect, the method further includes: determining, when a click operation on the second control is detected, that a second operation instruction for disabling the hardware security protection mode is received, where the second operation instruction is used for controlling the switch element to be turned on, so that the GND pin is not grounded, and the hardware security protection mode is disabled.

Therefore, an implementation of enabling or disabling the hardware security protection mode through hardware is provided. In an entire process, a user only needs to click on a corresponding control to quickly enable or disable the hardware security protection mode, which is convenient for the user to operate.

According to the fourth aspect or any one of the foregoing implementations in the fourth aspect, after the controlling, by a short circuit element based on the first control signal, an input/output unit to be short-circuited to ground, the method further includes: obtaining, by a processing unit CPU when receiving an access request to access the input/output unit, description information of an application program that accesses the input/output unit, where the description information is used for determining whether the application program is a system application; sending, by the CPU, a second control signal to the MCU through an I2C bus when it is determined, based on the description information, that the application program is the system application; outputting, by the MCU after receiving the second control signal, a third control signal through the GPIO pin; and controlling, by the short circuit element based on the third control signal, the input/output unit to be turned on. Therefore, the MCU can determine which failed input/output units should be restored for normal use based on the second control signal transmitted by the CPU, thereby ensuring normal use of the input/output units by the user.

According to a fifth aspect, this application provides a computer-readable medium configured to store a computer program. The computer program includes instructions for performing the method according to the third aspect or any possible implementation in the third aspect, and instructions for performing the method according to the fourth aspect or any possible implementation in the fourth aspect.

According to a sixth aspect, this application provides a computer program. The computer program includes instructions for performing the method according to the third aspect or any possible implementation in the third aspect, and instructions for performing the method according to the fourth aspect or any possible implementation in the fourth aspect.

According to a seventh aspect, this application provides a chip, including a processing circuit, and a transceiver pin. The transceiver pin and the processing circuit communicate with each other through an internal connection path. The processing circuit performs the method according to the third aspect or any possible implementation in the third aspect, or the method according to the fourth aspect or any possible implementation in the fourth aspect, to control a receive pin to receive a signal and to control a transmit pin to transmit the signal.

DETAILED DESCRIPTION OF ILLUSTRATIVE EMBODIMENTS

The following clearly and completely describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The term "and/or" used herein describes only an association relationship for describing associated objects and represents that three relationships may exist. For example, A and/or B may represent the following three cases: Only A exists, both A and B exist, and only B exists.

In the specification and claims in the embodiments of this application, the terms such as "first" and "second" are intended to distinguish between different objects, but do not indicate a particular order of the objects. For example, a first target object and a second target object are intended to distinguish between different target objects, but do not indicate a particular order of the target objects.

In the embodiments of this application, words such as "exemplary" or "for example" is used to represent giving an example, an illustration, or a description. Any embodiment or design solution described as an "exemplary" or "for example" in the embodiments of this application should not be explained as being more preferred or having more advantages than another embodiment or design solution. To be precise, the use of the words such as "exemplary" or "for example" is intended to present a related concept in a specific manner.

In the descriptions of embodiments of this application, unless otherwise stated, "a plurality of" means two or more than two. For example, a plurality of processing units refer to two or more processing units; and a plurality of systems refer to two or more systems.

The following describes the technical solutions provided in the embodiments of this application. It should be understood that, the following content is only implementation details provided for ease of understanding, and is not necessary to implement this solution.

Embodiments of this application provide an electronic device. The electronic device provided in the embodiments of this application may be a mobile phone, a tablet computer, a personal digital assistant (personal digital assistant, PDA for short), an in-vehicle computer, a smart wearable device, and a smart home device, and are not listed one by one herein.

In addition, a specific form of the foregoing electronic device is not limited in the embodiments of this application. For ease of description, a hardware structure of the mobile phone is described by using an example in which the electronic device is the mobile phone with reference to FIG. 1.

Figure 1:
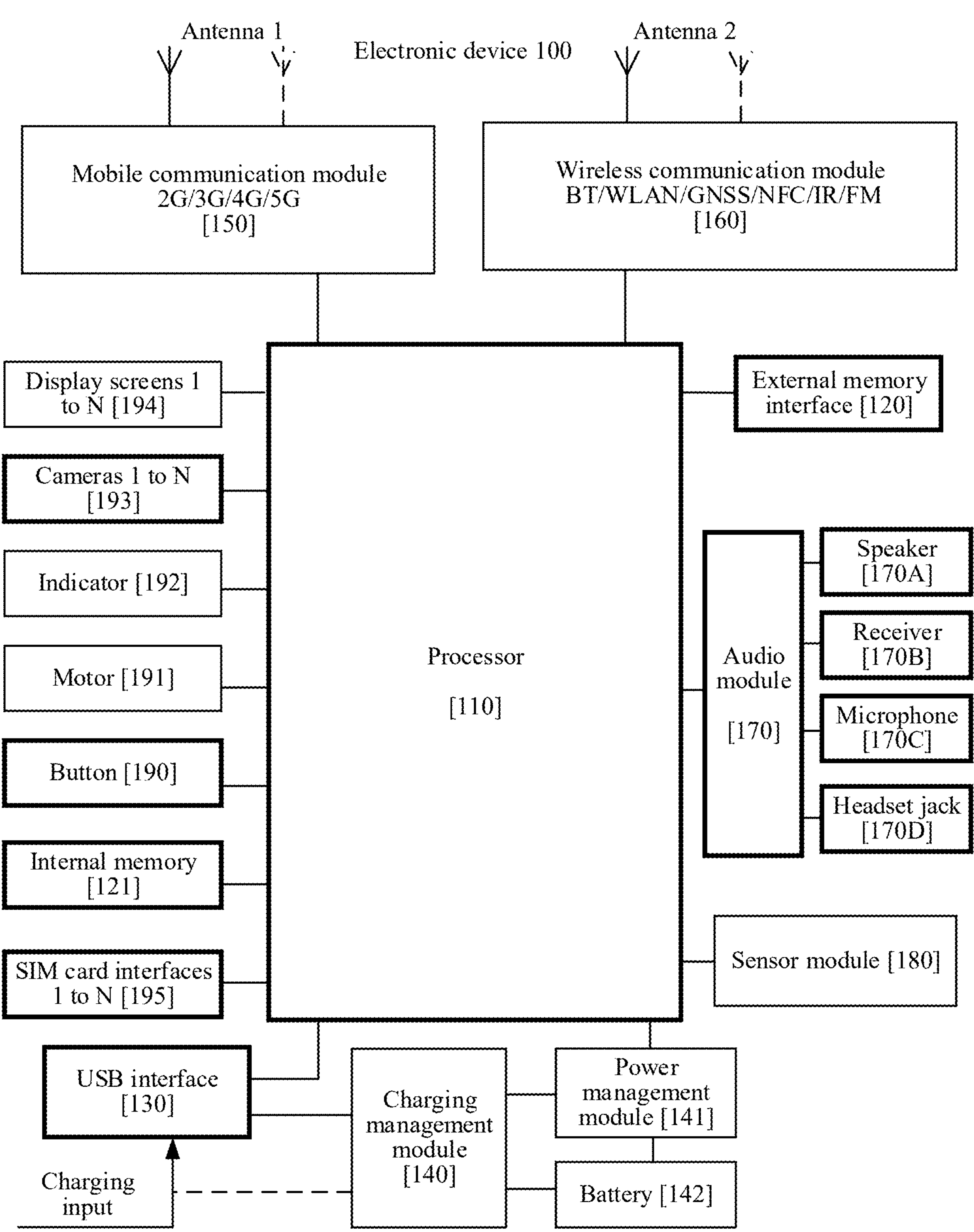
FIG. 1 is a schematic diagram of a hardware structure of an electronic device according to an embodiment of this application.

Referring to FIG. 1, the mobile phone 100 may include: a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a sensor module 180, a button 190, a motor 191, an indicator 192, a camera 193, a display 194, a subscriber identification module (subscriber identification module, SIM) card interface 195, and the like.

In addition, it should be noted that, in an actual application, the audio module 170 may include, for example, a loudspeaker 170A, a phone receiver 170B, a microphone 170C, and a headset jack 170D.

For example, the sensor module 180 may include, for example, a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

In addition, it should be further noted that, in an actual application, the button 190 may include, for example, a power button (power button), a home button (home button), and a volume button (volume up, volume down). The button 190 may be a mechanical button, or may be a touch-type button. The mobile phone 100 may receive a button input, and generate a signal input related to user setting and function control of the mobile phone 100.

In addition, it should be further noted that, in an actual application, the processor 110 may include one or more processing units. For example: the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU).

It may be understood that, in a specific implementation, different processing units may be independent elements, or may be integrated into one or more processors.

In addition, in some implementations, the controller may be a nerve center and a command center of the mobile phone 100. The controller may generate an operation control signal based on an instruction operation code and a timing signal, to complete control of fetching an instruction and executing the instruction.

In addition, a memory in the processor 110 may be configured to store instructions and data. In some embodiments, the memory in the processor 110 is a cache memory.

In addition, it may be understood that, in an actual application scenario, executable program code that triggers the mobile phone 100 to implement various functional applications and data processing is stored in the internal memory 121, and the executable program code includes instructions.

In addition, it should be noted that, to resolve the problems in BACKGROUND, the embodiments of this application provide a control circuit. The control circuit is integrated into the mobile phone 100, and the control circuit can perform short circuit control on the hardware devices, such as the camera 193, the internal memory 121, and the audio module 170, in the mobile phone that can obtain user privacy, so that the input/output unit can be selectively controlled to be in a failure state, that is, a third-party APK can be prevented from excessive collecting user information in terms of hardware, thereby improving the security of the usage of the electronic device.

For example, specifically, in the technical solutions provided in the embodiments of this application, the control circuit may be turned on by pressing the button 190, or through a software switch provided in the display interface.

This concludes the hardware structure of the mobile phone 100. It should be understood that, the mobile phone 100 shown in FIG. 1 is only an example. In a specific implementation, the mobile phone 100 may include more or fewer elements than those shown in the figure, or may combine two or more elements, or may include a different configuration of elements. The elements shown in FIG. 1 may be implemented by hardware, software, or a combination of hardware and software that includes one or more signal processing and/or application-specific integrated circuits.

To better understand a principle that the electronic device integrated with the control circuit provided in the embodiments of this application prevents, in terms of hardware, the third-party APK from excessively collecting user information, the following describes the control circuit provided in the embodiments of this application in detail with reference to the accompanying drawings.

Figure 2:
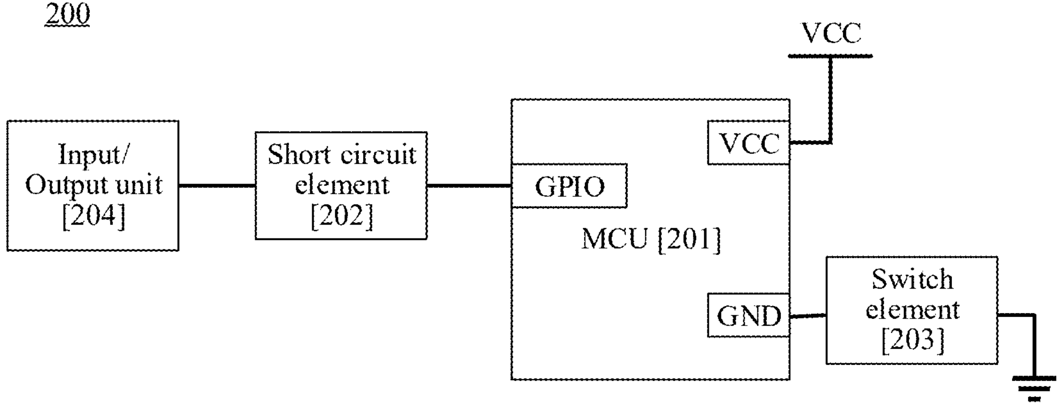
FIG. 2 is a schematic structural diagram of a control circuit according to an embodiment of this application.

Referring to FIG. 2, for example, in an implementation, a control circuit 200 includes, for example, an MCU 201, a short circuit element 202, a switch element 203, and an input/output unit 204.

Still referring to FIG. 2, for example, the MCU 201 includes at least one GPIO pin, and the one GPIO pin is connected to an input end of the short circuit element 202.

Still referring to FIG. 2, for example, a VCC pin of the MCU 201 is connected to a power supply voltage VCC, and a GND pin of the MCU 201 is grounded through the switch element 203.

Still referring to FIG. 2, for example, an output end of the short circuit element 202 is connected to a signal receiving end of the input/output unit 204.

It may be understood that, in an actual application, the power supply voltage VCC used for providing an operating power supply for the MCU 201 may come from the battery 142 of the mobile phone 100.

In addition, it should be noted that, the short circuit element 202 mentioned in this embodiment is an element that can control on and off of a current, that is, an element that can implement on and off functions. For example, the short circuit element may be electrical and electronics elements such as a metal-oxide-semiconductor field-effect transistor (Metal-Oxide-Semiconductor Field-Effect Transistor, MOSFET) (hereinafter referred to as a MOS transistor), a contactor, a relay, a circuit breaker, an air switch, and a button, and may also be electronic devices such as an electronic switch, a photoelectric switch, and a microwave switch, which are not listed one by one herein. This is not limited in this application as long as the short circuit element 202 can implement short circuit of the input/output unit 204 in an on state.

In addition, it should be further noted that, in this embodiment, the switch element 203 is a normally-open switch, that is, at an on position in a normal state. In this state, the GND pin of the MC 201 is not actually grounded, and in this case, the control circuit 200 does not work. When the switch element 203 is at an off position, that is, when the GND pin of the MCU 201 is grounded through the switch element 203, the control circuit 200 starts to work. In this case, the MCU 201 outputs a control signal (to distinguish the control signal from subsequent control signals, the control signal is referred to as a first control signal below) through the GPIO pin connected to the input end of the short circuit element 202. In this way, the short circuit element 202 is turned on after receiving the first control signal, so that the input/output unit 204 is short-circuited to ground. That is, the input/output unit 204 is enabled to be in the failure state, so that a third-party APK that obtains a permission to use the input/output unit 204 cannot use the input/output unit 204 to collect private information of a user, thereby providing security for the user to use the mobile phone.

In addition, it should be further noted that, the input/output unit 204 mentioned in this embodiment may be, for example, a camera unit (for example, the camera 193 as shown in FIG. 1), a microphone unit (for example, the microphone 170 as shown in FIG. 1), a storage unit (for example, the internal memory 121 as shown in FIG. 1), and various sensors arranged in the mobile phone.

For example, the sensors, for example, may be a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor, which are not listed one by one herein. This is not limited in this application.

In addition, in some implementations, the input/output unit 204 may further be the external memory interface 120 shown in FIG. 1. In this way, the external memory interface 120 is controlled to be short-circuited to ground, and the third-party APK cannot obtain information stored in an external storage device through the external memory interface 120.

In addition, in some other implementations, the input/output unit 204 may further be the USB interface 130 shown in FIG. 1. In this way, the USB interface 130 is controlled to be short-circuited to ground, and the third-party APK cannot obtain information stored in a device that is connected through the USB interface 130 through the USB interface 130.

In addition, in some other implementations, the input/output unit 204 may further be the SIM card interface 195 shown in FIG. 1. In this way, the SIM card interface 195 is controlled to be short-circuited to ground, and the third-party APK cannot obtain contact information stored in the SIM card through the SIM card interface 195.

In addition, in some other implementations, the input/output unit 204 may further be the speaker 170A shown in FIG. 1. In this way, the speaker 170A is controlled to be short-circuited to ground, and the third-party APK cannot obtain sound information currently played by the speaker 170A.

In addition, in some other implementations, the input/output unit 204 may further be the phone receiver 170B shown in FIG. 1. In this way, the phone receiver 170B is controlled to be short-circuited to ground, and the third-party APK cannot obtain sound information of the user and surrounding background sound through the phone receiver 170B.

In addition, in some other implementations, the input/output unit 204 may further be the headset jack 170D shown in FIG. 1. In this way, the headset jack 170D is controlled to be short-circuited to ground, and the third-party APK cannot obtain sound information played by a headset connected through the headset jack 170D through the headset jack 170D.

It should be understood that, the foregoing description is only an example for better understanding of the technical solutions of this embodiment, and is not a unique limitation on this embodiment. Specifically, in an actual application, the input/output unit 204 includes, but not limited to, the foregoing examples. In another optional implementation, the input/output unit 204 may be any hardware device that can obtain the private user information.

Therefore, the control circuit provided in this embodiment configures the short circuit element for the input/output unit that can output the private user information, and controls the short circuit element by using the first control signal outputted by the GPIO pin of the MCU to short circuit the input/output unit, In this way, the input/output unit can be selectively controlled to be in the failure state, that is, the third-party APK can be prevented from excessively collecting user information in terms of the hardware, thereby improving the security of the usage of the electronic device.

Figure 3:
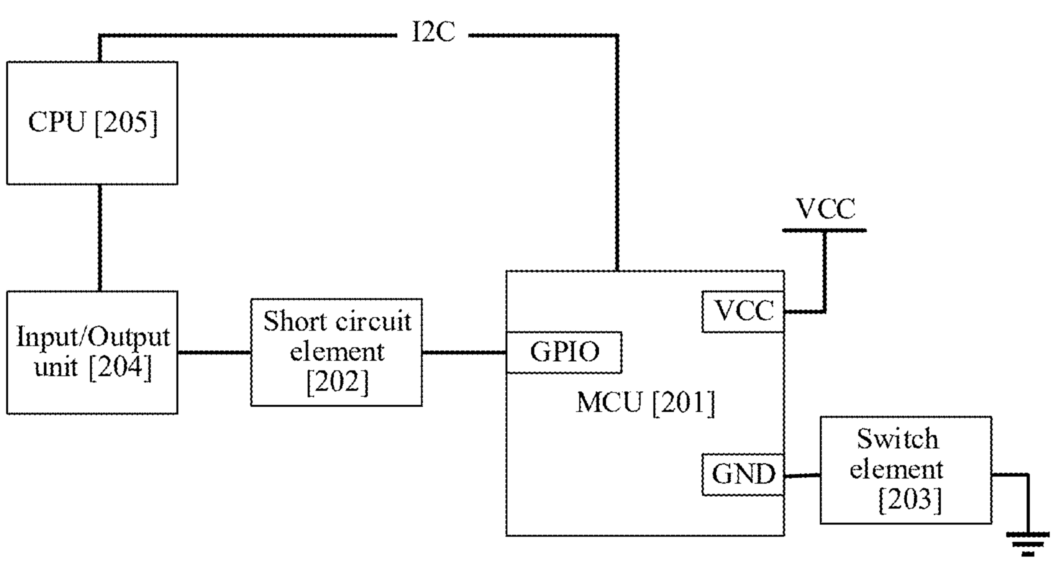
FIG. 3 is a schematic structural diagram of still another control circuit according to an embodiment of this application.

Further, when the control circuit 200 is in a working mode, to enable a system-level APK to access the input/output unit 204 that is currently in the failure state, for example, a camera APK that comes with a system can use a camera that is in the failure state to take pictures, or a call APK that comes with a system can use audio modules that are in the failure state, such as a microphone, a headset, a speaker, and a phone receiver, to make calls, the control circuit 200 may further include the processing unit CPU 205 shown in FIG. 3, and then the CPU 205 notifies the MCU 201 which input/output unit 204 the system APK needs to access through the I2C bus in a communication manner, so that the input/output unit 204 is turned on, and the input/output unit 204 is restored from the failure state to an available state.

In addition, it should be noted that, it is considered that in an actual application, before the control circuit 200 is in the working mode, that is, before the hardware security protection mode provided by this embodiment is enabled, if the user is using a certain input/output unit 204, such as a camera, through the system APK. In this case, to ensure that the hardware security protection mode is enabled and the system APK can still use the camera, it may be set that every time the system application accesses the input/output unit 204, the CPU 205 notifies the MCU 201 through the I2C bus in a communication manner of the information about the input/output unit 204, for example, an access time, a specific input/output unit 204 (a camera, a microphone, a headset jack, a speaker, a phone receiver, and the like), that is currently accessed by the system APK. In this way, when a hardware security protection mode is enabled and the MCU 201 queries that a certain input/output unit 204 is currently being used by the system APK, the used input/output unit 204 is still maintained in the available state, that is, the used input/output unit 204 is not short-circuited, and another unused input/output unit 204 is controlled to be short-circuited and in the failure state.

Correspondingly, if the hardware security protection mode is enabled, the CPU 205 notifies the MCU 201 of the input/output unit 204 that is previously used by the system APK through the I2C bus in a communication manner, and if the camera is released, the MCU 201 controls the camera to be short-circuited, so that the camera is in the failure state.

In addition, it should be further noted that, it is considered that in an actual application, before the control circuit 200 is in the working mode, that is, before the hardware security protection mode provided by this embodiment is enabled, if the user is using a certain input/output unit 204 (such as a camera) through the third-party APK, that is, the camera is not used by the third-party APK when the user is not in the know. In this case, to prevent the hardware security protection mode from being enabled and affecting use by the user, when the user enables the hardware security protection mode, the user may be prompted by a pop-up window. When the user determines to enable the hardware security protection mode, the camera is in the failure state after this mode is enabled.

It should be understood that, the foregoing description is only an example for better understanding of the technical solutions of this embodiment, and is not a unique limitation on this embodiment.

Referring to FIG. 3, for example, the CPU 205 communicates with the MCU 201 through the I2C bus, so that when the input/output unit 204 needs to be used, the CPU 205 may transmit a control signal to the MCU through the I2C bus (for ease of distinction, the control signal transmitted by the CPU to the MCU through the I2C bus is hereinafter referred to as a second control signal).

It should be noted that, the second control signal is used for indicating identification information of the input/output unit 204 that the system APK needs to use. In this way, after receiving the second control signal transmitted by the CPU 205 through the I2C bus, the MCU 201 can determine which one or which input/output units 204 need to be restored to the available state.

In addition, it should be noted that, in some implementations, to implement that all input/output units 204 in the electronic device that may collect user private data is controlled, a quantity of short circuit elements 202 in the control circuit 200 and a quantity of input/output units 204 may be the same, and in a one-to-one correspondence, that is, each input/output unit 204 corresponds to a unique short circuit element 202.

In addition, it should be understood that, in some implementations, the MCU 201 usually has a plurality of GPIO pins, so that one GPIO pin of the MCU 201 may be selected to be connected to the input end of each short circuit element

202. In this way, short-circuit control of all input/output units 204 may be implemented through one GPIO pin.

For example, in some other implementations, each short circuit element 202 may be set to correspond to one GPIO pin of the MCU 201, that is, there is need to ensure that at least a quantity of GPIO pins of the MCU 201 and a quantity of short circuit elements 202 are the same, and in a one-to-one correspondence. In this way, short-circuit control of different input/output units 204 may be implemented through different GPIO pins, so that some of the input/output units 204 may be selectively failed.

For example, after MCU 201 determines the input/output unit 204 that needs to be restored to the available state based on the second control signal, a control signal may be outputted through the GPIO pin corresponding to the input/output unit 204 (for ease of distinction, a control signal used for restoring the available state of the input/output unit 204 is hereinafter referred to as a third control signal).

It may be understood that, in some implementations, each input/output unit 204 corresponds to a short circuit element 202 configured to control to be short-circuited to ground or to be turned on, and the input end of each short circuit element 202 is connected to one GPIO pin of the MCU 201. Therefore, the third control signal is specifically outputted from the GPIO pin connected to the input end of the short circuit element 202 corresponding to the input/output unit 204 that needs to be restored to the available state. In this way, if the short circuit element 202 of the third control signal is received, a corresponding input/output unit 204 is controlled to be turned on, so that the available state is restored.

Still referring to FIG. 3, for example, the clock signal port of the CPU 205 is connected to the signal receiving end of the input/output unit 204. In this way, after the input/output unit 204 is restored to the available state, the CPU 205 may transmit a clock signal to the input/output unit 204 through the clock signal port.

Correspondingly, after receiving the clock signal transmitted by the CPU 205 through the clock signal port, the input/output unit 204 may regularly transmit the obtained information to the CPU based on a period of the clock signal in response to the clock signal. For example, when the input/output unit 204 is a camera, information transmitted to the CPU 205 may be a captured image/video frame; and when the input/output unit 204 is a microphone, information transmitted to the CPU 205 may be pick-up sound information.

Therefore, the control circuit provided in this embodiment establishes communication between the CPU and the MCU through the I2C bus. In this way, the MCU can determine which failed input/output units should be restored for normal use based on the second control signal transmitted by the CPU, thereby ensuring normal use of the input/output units by the user.

Figure 4:
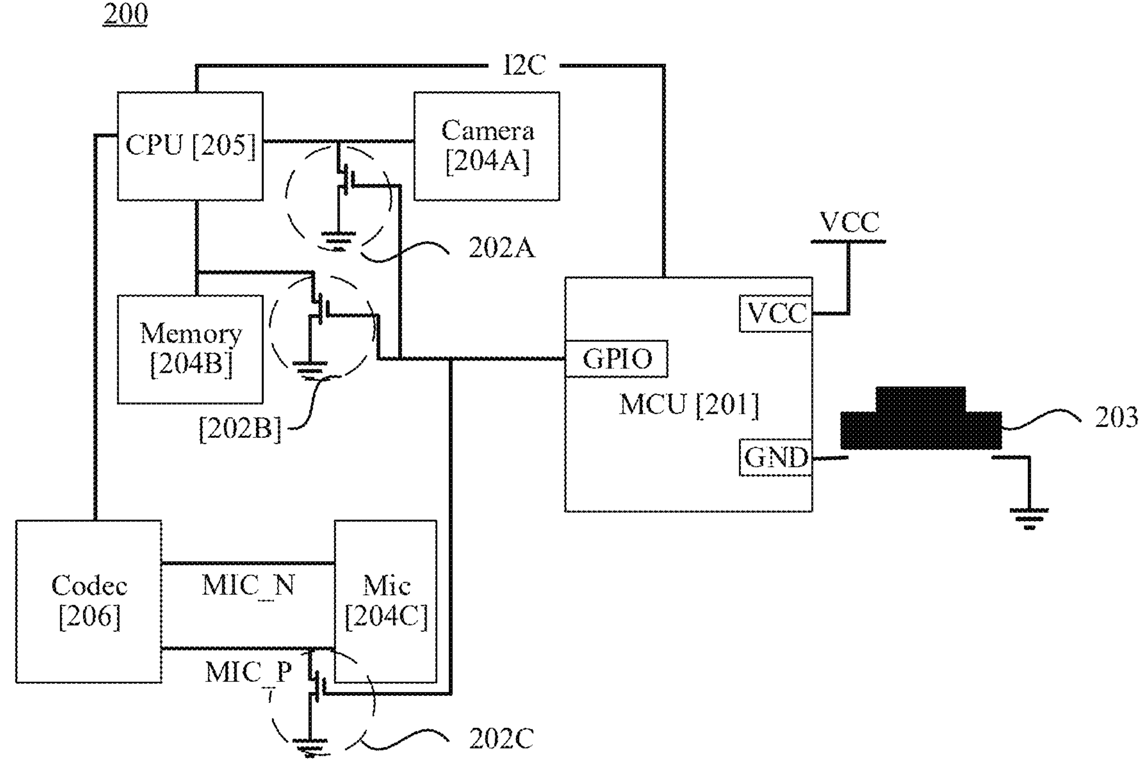
FIG. 4 is a schematic structural diagram of still another control circuit according to an embodiment of this application.

To better understand a one-to-many correspondence between the GPIO pin and the short circuit element 202, the following describes in detail with reference to FIG. 4.

Referring to FIG. 4, for example, in this embodiment, an example in which the switch element 203 is a mechanical button, such as a volume up button of a volume button, arranged on the electronic device, the input/output unit 204 includes a Camera 204A, a Memory 204B, and a Mic 204C, and short circuit elements that are in a one-to-one correspondence with three input/output units are MOS transistors (a MOS transistor 202A corresponds to a Camera 204A, a MOS transistor 202B corresponds to a Memory 204B, and a MOS transistor 202C corresponds to a Mic 204C) are used for description.

Still referring to FIG. 4, for example, the MOS transistor 202A, the MOS transistor 202B, and the MOS transistor 202C are all connected to a same GPIO pin of the MCU 201, and the CPU 205 is respectively in communication connection with the Camera 204A, the Memory 204B, and the Mic 204C, for example, through a clock signal port.

It should be noted that, generally, to reduce space occupied by digital storage, audio and video data need to be performed compression and decompression processing. Therefore, when the input/output unit 204 includes the microphone 204C, the control circuit 200 further needs to include a codec (COder-DECoder, hereinafter referred to as Codec) 206. In this way, the space occupied by digital storage can be effectively reduced by performing compression (CO) and decompression (DEC) on the video data and the audio data through the Codec 206. In addition, in a computer system, compression and decompression is performed on the audio and video data by using the codec, which can save CPU 205 resources and improve operating efficiency of the system.

Still referring to FIG. 4, a positive input end of the Codec 206 is connected to a positive output end (MIC_P) of the MIC 204C, a negative input end of the Codec 206 is connected to a negative output end (MIC_N) of the microphone, and a signal receiving end of the Codec 206 is connected to a clock signal end of the CPU 205, so that audio data collected by the MIC 204C is regularly obtained based on the clock signal of the CPU 205.

In addition, still referring to FIG. 4, in this embodiment, the positive input end of the MIC 204C is the signal receiving end and is connected to an output end of the MOS transistor 202C.

Figure 5:
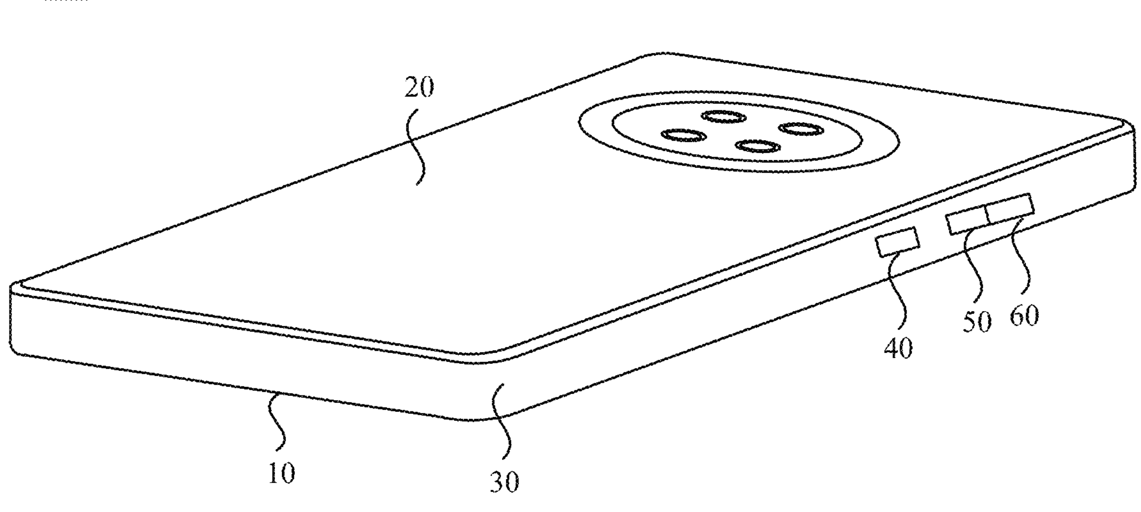
FIG. 5 is a schematic structural diagram of a mechanical button of an electronic device according to an embodiment of this application.

In addition, to better understand a method of triggering the control circuit 200 to enter the working mode when the switch element 203 is the volume up button of the electronic device, an example in which the electronic device is the mobile phone 100 is used for description with reference to FIG. 5.

Referring to FIG. 5, for example, the mobile phone 100 includes a display panel 10, a rear housing 20, a middle frame 30, and a power button 40, a volume down button 50 (used for decreasing a volume), and a volume up button 60 (used for increasing a volume) arranged on the middle frame. The display panel 10, the rear housing 20, and the middle frame 30 may enclose an accommodating cavity. The accommodating cavity is provided with structures such as a motherboard, a battery, and a functional device (not shown in the figure). The functional device includes, for example, a display driver chip, a processor, and the control circuit 200 in this embodiment.

In addition, it should be noted that, in this embodiment, a material of the rear housing 20 of the mobile phone 100 may include, for example, opaque materials such as plastic, plain leather, and fiberglass, or may further include light-transmitting materials such as glass. The material of the rear housing 20 is not limited in the embodiments of this application.

In addition, it should be further noted that, in this embodiment, the display panel 10 of the mobile phone 100 includes, for example, a liquid crystal display (Liquid Crystal Display, LCD) panel, an organic light emitting diode (Organic Light Emitting Diode, OLED) display panel, and an LED display panel, where the LED display panel includes, for example, a Micro-LED display panel, and a Mini-LED display panel. A type of the display panel 10 is not limited in the embodiments of this application.

Therefore, based on the foregoing structure of the mobile phone 100, when the volume up button 60 is pressed by the user, if a pressing time is greater than 10 s, the GND pin of the MCU 201 is grounded through the volume up button 60, and the control circuit 200 enters the working mode. In this case, first control signals of short-circuited Camera 204A, Memory 204B, and Mic 204C may be transmitted through the GPIO pin.

For example, in some other implementations, based on the foregoing structure of the mobile phone 100, when the volume up button 60 is continuously pressed for a plurality of times (such as 3 times) by the user within a set time (such as 3 s), the GND pin of the MCU 201 may further be grounded through the volume up button 60, and the control circuit 200 enters the working mode. In this case, first control signals of short-circuited Camera 204A, Memory 204B, and Mic 204C may be transmitted through the GPIO pin.

Correspondingly, the MOS transistor 202A, the MOS transistor 202B, and the MOS transistor 202C are turned on based on the first control signal, so that the Camera 204A corresponding to the MOS transistor 202A is short-circuited to ground, the Memory 204B corresponding to the MOS transistor 202B is short-circuited to ground, and the Mic 204C corresponding to the MOS transistor 202C is short-circuited to ground. That is, the Camera 204A, the Memory 204B, and the Mic 204C all in the failure state and cannot be used, so that private data of the user cannot be collected.

Correspondingly, if a certain system application, such as a camera APK, in the mobile phone 100 needs to call the Camera 204A to take pictures, in this case, the CPU 205 determines identification information of the called Camera 204A based on a request of the camera APK, and then transmits the identification information of the Camera 204A to the MCU 201 through the I2C bus. In this way, the MCU 201 may transmit a control signal to restore a normal state of the Camera 204A to the MOS transistor 202A through the GPIO pin, and the MOS transistor 202A is disconnected after receiving the control signal, so that the Camera 204A is turned on and restored to the normal state. In this way, the camera APK may normally call the Camera 204A to take pictures.

It should be understood that, the foregoing description is only an example for better understanding of the technical solutions of this embodiment, and is not a unique limitation on this embodiment. In an actual application, the volume down button 50 may further be set as the switch element 203. This is not limited in this embodiment.

In addition, it should be noted that, in an actual application, since pressing the volume down button 50 or the volume up button 60 may be regarded as adjusting the volume, a method of triggering the MCU 201 to transmit the first signal through a quantity of times of pressing may be set to simultaneously pressing the volume down button 50 and the volume up button 60 for a set quantity of times within a set time, or pressing another mechanical button. A specific implementation logic may be set based on actual service requirements. This is not limited herein.

In addition, it should be further noted that, for a manner of triggering the control circuit 200 to exit the working mode, when the switch element 203 is the volume up button 60, and when the control circuit 200 is in the working mode, the volume up button 60 may be long pressed for 10 s.

Correspondingly, when the switch element 203 is the volume down button 50, and when the control circuit 200 is in the working mode, the volume down button 50 may be long pressed for 10 s.

Therefore, the control circuit provided in this embodiment may implement short-circuit control of all input/output units 204 through one GPIO pin of the MCU 201. The circuit is simple in structure and is convenient to implement.

Figure 6:
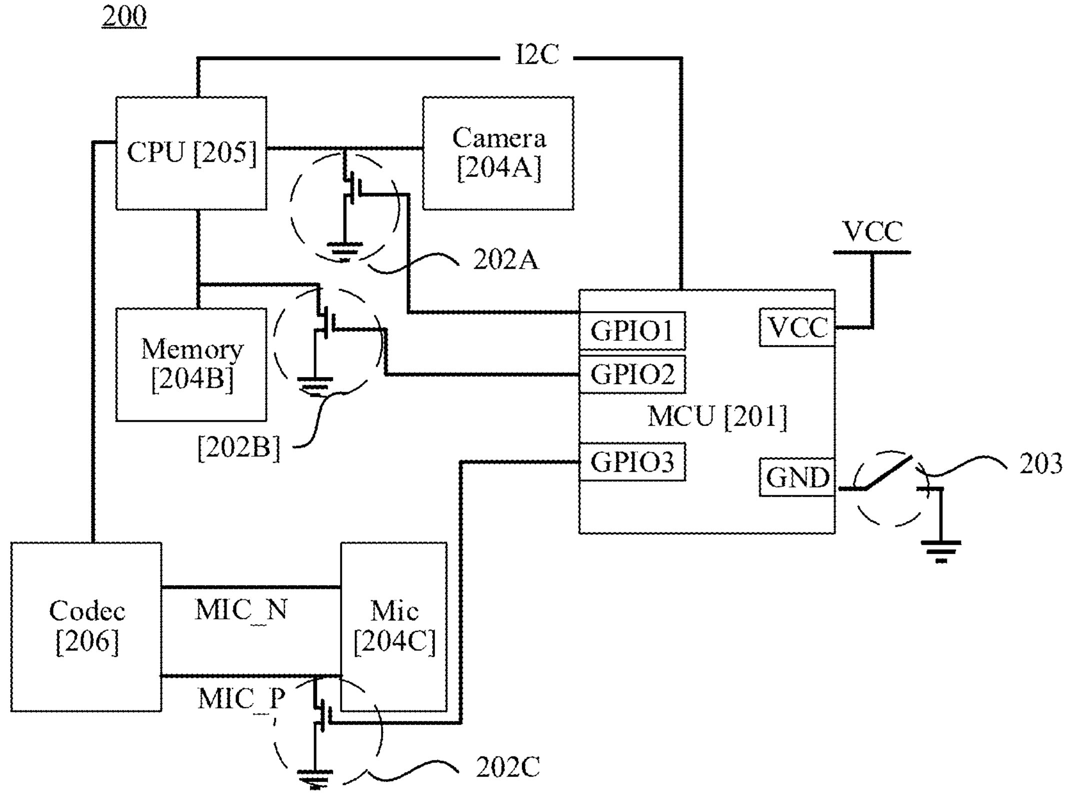
FIG. 6 is a schematic structural diagram of still another control circuit according to an embodiment of this application.

To better understand a one-to-one correspondence between the GPIO pin and the short circuit element 202, the following describes in detail with reference to FIG. 6.

Referring to FIG. 6, for example, in this embodiment, an example in which the switch element 203 is a switch (a button that controls the switch is exposed on the electronic device to facilitate user operation), the input/output unit 204 includes a Camera 204A, a Memory 204B, and a Mic 204C, and short circuit elements that are in a one-to-one correspondence with three input/output units are MOS transistors (a MOS transistor 202A corresponds to a Camera 204A, a MOS transistor 202B corresponds to a Memory 204B, and a MOS transistor 202C corresponds to a Mic 204C) are used for description.

Still referring to FIG. 6, for example, the MOS transistor 202A, the MOS transistor 202B, and the MOS transistor 202C are respectively connected to different GPIO pins of the MCU 201. For example, the input end of the MOS transistor 201A is connected to a GPIO1 pin, the input end of the MOS transistor 201B is connected to a GPIO2 pin, the input end of the MOS transistor 201C is connected to a GPIO3 pin, and the CPU 205 is respectively in communication connection with the Camera 204A, the Memory 204B, and the Mic 204C, for example, through a clock signal port.

It may be learned from the description of the foregoing embodiment that, when the input/output unit 204 of the control circuit 200 includes the Mic 204C, the Codec 206 is further needed in the control circuit 200. Therefore, the control circuit 200 in the embodiment shown in FIG. 6 further includes the Codec 206. For a connection between the Codec 206 and devices in the control circuit 200, such as the CPU 205 and the Mic 204C, reference may be made to the description in the embodiment shown in FIG. 4, and details are not described herein again.

Figure 7:
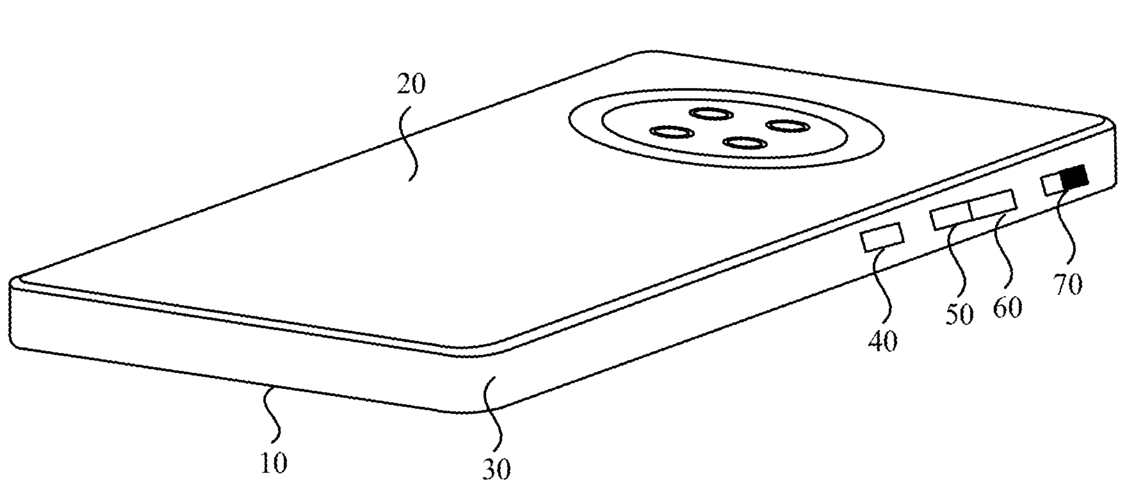
FIG. 7 is a schematic structural diagram of a mechanical button of still another electronic device according to an embodiment of this application.
Figure 8:
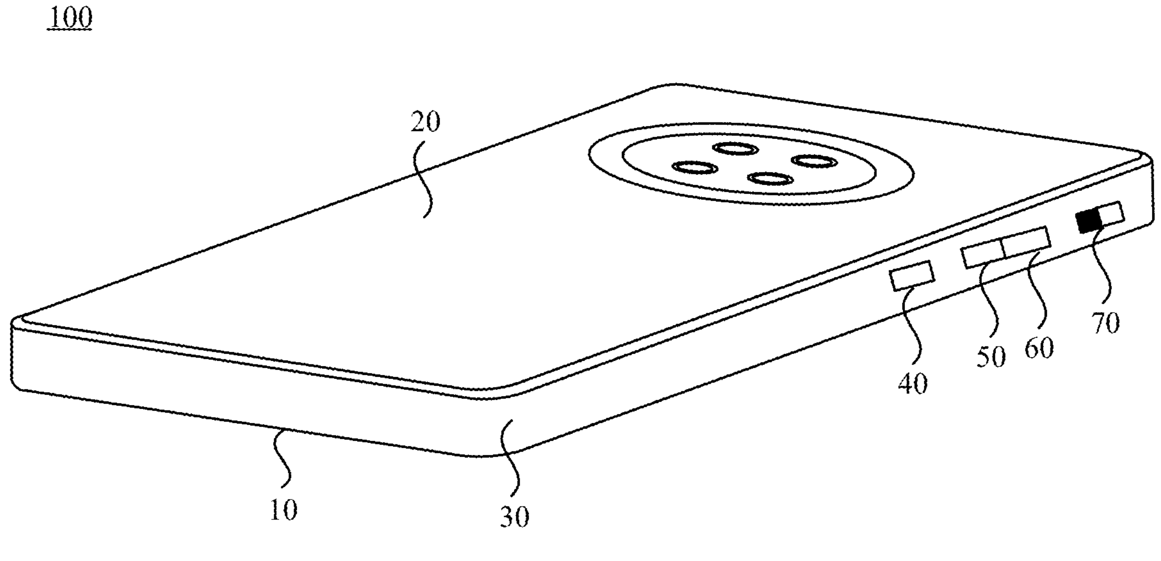
FIG. 8 is a schematic structural diagram of a mechanical button of still another electronic device according to an embodiment of this application.

In addition, to better understand a manner of triggering the control circuit 200 to enter the working mode when the switch element 203 is the switch, an example in which the electronic device is the mobile phone 100 is used for description with reference to FIG. 7 and FIG. 8.

Referring to FIG. 7, for example, the mobile phone 100 includes a display panel 10, a rear housing 20, a middle frame 30, and a power button 40, a volume down button 50 (used for decreasing a volume), a volume up button 60 (used for increasing a volume), and a control button 70 of a switch arranged on the middle frame. The display panel 10, the rear housing 20, and the middle frame 30 may enclose an accommodating cavity. The accommodating cavity is provided with structures such as a motherboard, a battery, and a functional device (not shown in the figure). The functional device includes, for example, a display driver chip, a processor, and the control circuit 200 in this embodiment.

For example, in some implementations, it may be agreed that when the control button 70 of the switch is in a state shown in FIG. 7, it represents that the switch is currently at an off position, corresponding to the control circuit 200, and the switch element 203 is in a state shown in FIG. 6. In this case, the control circuit 200 does not work.

Based on this agreement, when the user toggles the control button 70 of the switch to enable the control button 70 of the switch in a state shown in FIG. 8, it represents that the switch is currently at an off position. In this case, the GND pin of the MCU 201 is grounded through the switch, and the control circuit 200 enters the working mode. In this way, the MCU 201 may transmit the first control signal of short-circuited Camera 204A through the GPIO1 pin, transmit the first control signal of short-circuited Memory 204B through the GPIO2 pin, and transmit the first control signal of short-circuited Mic 204C through the GPIO3 pin.

Correspondingly, the MOS transistor 202A, the MOS transistor 202B, and the MOS transistor 202C are turned on based on the first control signal, so that the Camera 204A corresponding to the MOS transistor 202A is short-circuited to ground, the Memory 204B corresponding to the MOS transistor 202B is short-circuited to ground, and the Mic 204C corresponding to the MOS transistor 202C is short-circuited to ground. That is, the Camera 204A, the Memory 204B, and the Mic 204C all in the failure state and cannot be used, so that private data of the user cannot be collected.

Correspondingly, if a certain system application, such as a call APK, in the mobile phone 100 needs to call the Mic 204C for a call, in this case, the CPU 205 determines identification information of the called Mic 204C based on a request of the call APK, and then transmits the identification information of the Mic 204C to the MCU 201 through the I2C bus. In this way, the MCU 201 may transmit a control signal to restore a normal state of the Mic 204C to the MOS transistor 202C through the GPIO3 pin, and the MOS transistor 202C is disconnected after receiving the control signal, so that the Mic 204C is turned on and restored to the normal state. In this way, the call APK may normally call the Mic 204C to make calls.

It should be understood that, the foregoing description is only an example for better understanding of the technical solutions of this embodiment, and is not a unique limitation on this embodiment.

Therefore, the control circuit provided in this embodiment performs short circuit control on different input/output units 204 through different GPIO pins of the MCU 201, so that some input/output units 204 may be selectively failed to better adapt to different usage scenarios and user requirements.

In addition, it should be further noted that, in an actual application, to ensure the security of communication between the CPU 205 and the MCU 201, the used MCU 201 may have both a control function and an encryption function. In this way, information transmitted between the CPU 205 and the MCU 201 through the I2C bus may be encrypted and transmitted based on an agreed encryption and decryption method, thereby preventing the third-party APK from intercepting the information transmitted between the CPU 205 and the MCU 201, and further ensuring the security of the electronic device of the user.

In addition, it should be further noted that, when the short circuit element 204 in the control circuit 200 is a MOS transistor, a PMOS transistor or an NMOS transistor may be selected based on service requirements. This is not limited in this application.

Correspondingly, when the MOS transistor is an NMOS transistor, a gate of the NMOS transistor is grounded, a drain of the NMOS transistor is an input end and is connected to the GPIO pin of the MCU, and a source of the NMOS transistor is an output end and is connected to the signal receiving end of the input/output unit; and when the MOS transistor is a PMOS transistor, a gate of the PMOS transistor is grounded, a source of the PMOS transistor is an input end and is connected to the GPIO pin of the MCU, and a drain of the PMOS transistor is an output end and is connected to the signal receiving end of the input/output unit.

It should be understood that, since the NMOS transistor can only be turned on when the inputted signal is a high-level signal, when the short circuit element 204 is an NMOS transistor, the first control signal outputted by the MCU through the GPIO pin is a high-level signal. In this way, when the NMOS transistor is turned on in response to the high-level signal, the input/output unit 204 connected to the NMOS transistor may be short-circuited to the ground, that is, the input/output unit 204 connected to the NMOS transistor may be controlled to be failed and unavailable.

In addition, it should be further understood that, since the PMOS transistor can only be turned on when the inputted signal is a low-level signal, when the short circuit element 204 is a PMOS transistor, the first control signal outputted by the MCU through the GPIO pin is a low-level signal. In this way, when the PMOS transistor is turned on in response to the high-level signal, the input/output unit 204 connected to the NMOS transistor may be short-circuited to the ground, that is, the input/output unit 204 connected to the NMOS transistor may be controlled to be failed and unavailable.

This concludes the description of the control circuit 200. It may be understood that, the foregoing description is only an example for a better understanding of the technical solutions of this embodiment, and is not the only limitation on this embodiment. Specifically, in an actual application, a specific structure of the control circuit 200 includes, but not limited to, the foregoing examples. In another optional implementation, the control circuit 200 may further be configured in another manner, as long as the MCU 201 can transmit a control signal to the short circuit element 202 through the GPIO pin, so that the short circuit element 202 controls the input/output unit 203 to be short-circuited to ground based on the control signal.

Based on the control circuit in any of the foregoing embodiments, when the electronic device integrating the control circuit triggers the control circuit to selectively fail the input/output unit, a manner of triggering may be implemented through a mechanical button on the electronic device, such as the volume up button 60 shown in FIG. 5, or the control button 70 of the switch shown in FIG. 7 and FIG. 8, or may be implemented by an APK installed in the electronic device to enable the hardware security protection mode.

For example, to ensure security, the APK used to enable the hardware security protection mode may be a system APK. This prevents the user from downloading a APK developed by a malicious third party from an application market to enable the hardware security protection mode.

For an implementation of entering the working mode and exiting the working mode by triggering the control circuit 200 through the mechanical button on the electronic device, the foregoing embodiment describes with reference to FIG. 5, FIG. 7, and FIG. 8. To better understand, an example in which a usage scenario is implemented by a APK installed in the electronic device to enable the hardware security protection mode, and the electronic device is the mobile phone are used for description in detail with reference to FIG. 9 to FIG. 11.

Before this embodiment is described, first, there is need to explain that an implementation of triggering the control circuit 200 to enter the working mode and exit the working mode through software may be different from an implementation of triggering the control circuit 200 to enter the working mode and exit the working mode through the mechanical button.

Specifically, for the implementation of triggering the control circuit 200 to enter the working mode and exit the working mode by using the mechanical button described in the foregoing embodiment, the mechanical button may be used as the switch element to implement that the GND pin of the MCU 201 is grounded. Therefore, the implementation of triggering the control circuit 200 to enter the working mode and exit the working mode by using the mechanical button, once grounding is implemented through the mechanical button, the MCU 201 may immediately transmit the first control signal, and then perform short-circuit on all the input/output units 204 through the short circuit element 202. When the ground is disconnected, the input/output unit 204 that is in the failure state may be immediately restored to the available state. For the implementation of triggering the control circuit 200 to enter the working mode and exit the working mode through software, the GND pin of the MCU 201 may be set to be always grounded. However, when to transmit the first control signal to perform short-circuit on all input/output units 204 through the short circuit element 202, or restore the input/output unit 204 in the failure state to the available state, may be controlled by software. Alternatively, for the implementation of triggering the control circuit 200 to enter the working mode and exit the working mode through software, the GND pin of the MCU 201 is first controlled to be grounded through one step, and then one or more input/output units 204 is controlled to be short-circuited based on a next or a plurality of steps.

Figure 9:
FIG. 9 is a schematic diagram of a home page of an electronic device according to an embodiment of this application.
Figure 9:
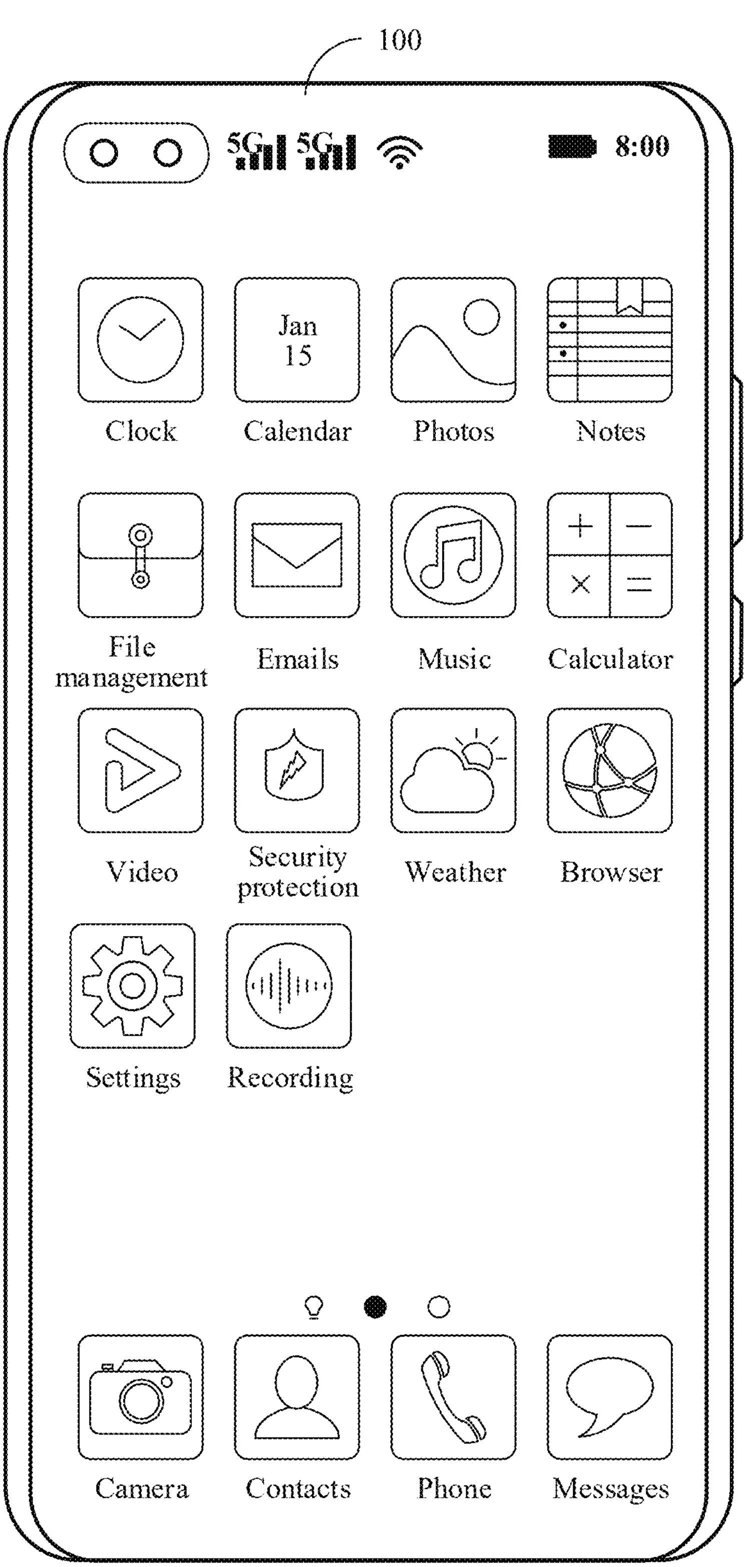

For the implementation of triggering the control circuit 200 to enter the working mode and exit the working mode through software, details are as follows:

Referring to FIG. 9, for example, the home page of the mobile phone 100 displays a plurality of installed APKs, for example, system APKs such as a security protection APK (a APK used to enable the hardware security protection mode in this embodiment), a clock APK, a calendar APK, a gallery APK, a memo APK, a file management APK, a calculator APK, a settings APK, a recorder APK, a camera APK, a contacts APK, a phone APK, and a message APK, as well as third-party APKs such as an email APK, a music APK, a video APK, a weather APK, and a browser APK.

It should be understood that, the foregoing description is only an example for better understanding of the technical solutions of this embodiment, and is not a unique limitation on this embodiment.

Figure 10:
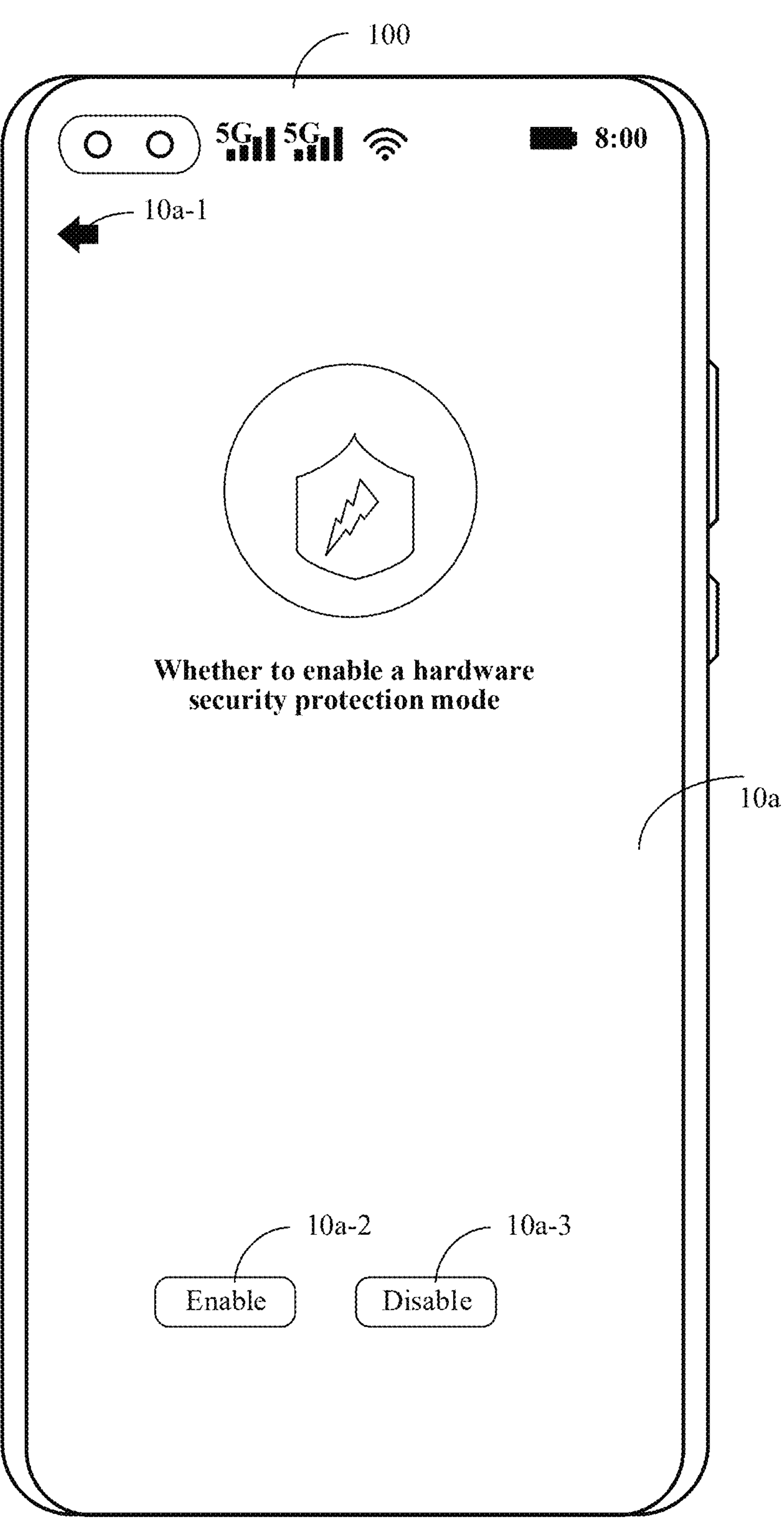
FIG. 10 is a schematic diagram of a display page of a control circuit that is turned on/turned off through software according to an embodiment of this application.

Still referring to FIG. 9, for example, when the user clicks on the security protection APK, the mobile phone 100 starts the security protection APK in response to an operation behavior of the user, and the display page displays a page 10*a* of whether to enable the hardware security protection mode as shown in FIG. 10.

Referring to FIG. 10, for example, the page 10 may include one or more controls, such as a control 10*a*-1 for exiting the page 10*a*, a control 10*a*-2 for enabling the hardware security protection mode, that is, for triggering the control circuit 200 to enter the working mode, and a control 10*a*-3 for disabling the hardware security protection mode, that is, for triggering the control circuit 200 to exit the working mode.

It should be understood that, the foregoing description is only an example for better understanding of the technical solutions of this embodiment, and is not a unique limitation on this embodiment.

Figure 11:
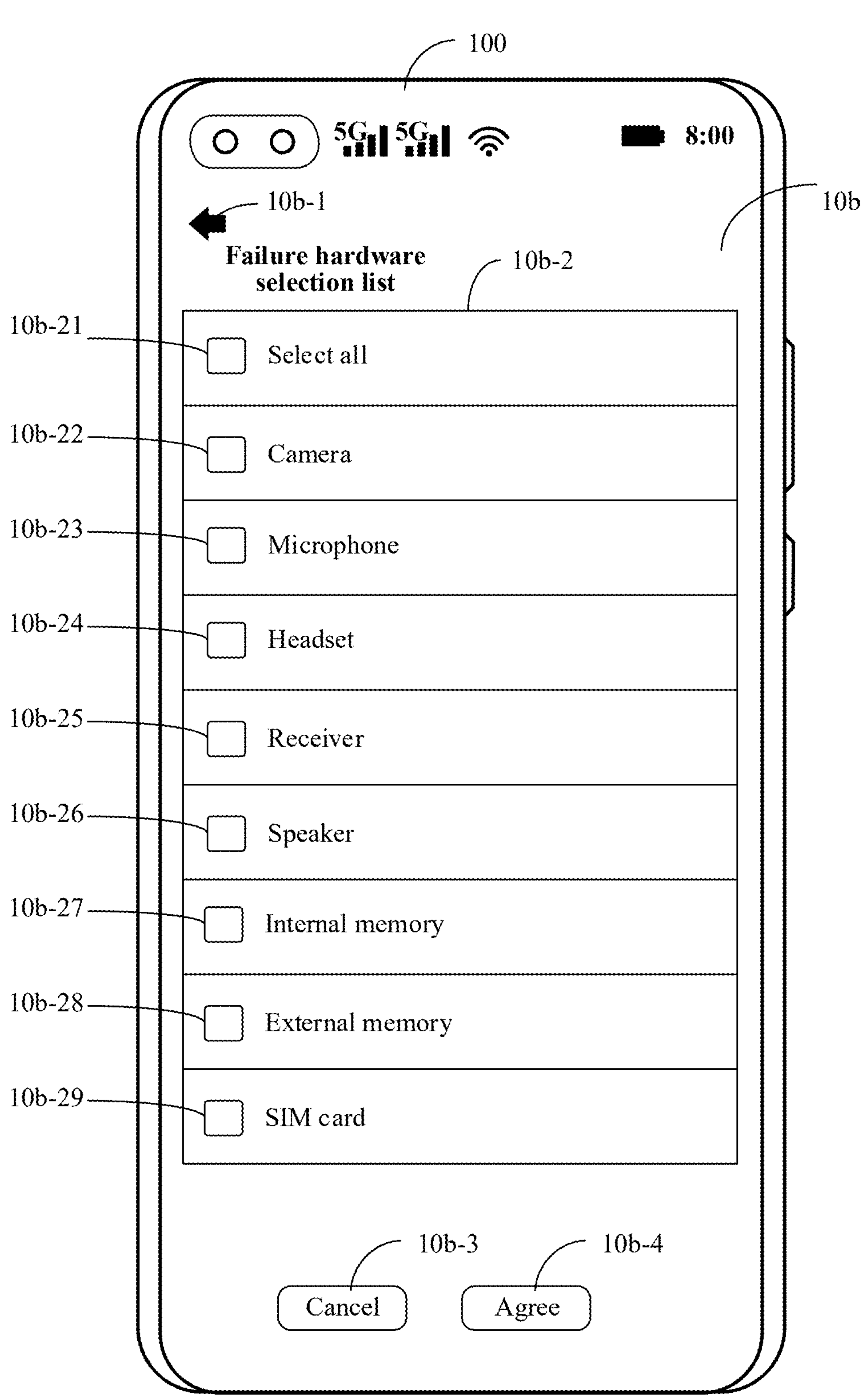
FIG. 11 is a schematic diagram of a display page for selecting hardware that needs to be failed according to an embodiment of this application.

Still referring to FIG. 10, for example, when the user clicks the control 10*a*-2, the mobile phone 100 jumps from the page 10*a* to a page 10*b* that is for selecting failed hardware shown in FIG. 11 in response to the operation behavior of the user.

Referring to FIG. 11, for example, the page 10*b* may include one or more controls, such as a control 10*b*-1 for exiting the page 10*b*, a failed hardware selection list 10*b*-2, a control 10*b*-3 for deselecting the selected hardware, and a control 10*b*-4 for agreeing to fail the selected hardware.

Still referring to FIG. 11, for example, the failed hardware selection list 10*b*-2 may include one or more controls, such as a control 10*b*-21 for selecting all hardware (input/output units) in a list, a control 10*b*-22 for separately selecting a camera, a control 10*b*-23 for separately selecting a microphone, a control 10*b*-24 for separately selecting a headset jack (an interface), a control 10*b*-25 for separately selecting a phone receiver, a control 10*b*-26 for separately selecting a speaker, a control 10*b*-27 for separately selecting an internal memory, a control 10*b*-28 for separately selecting an external memory, and a control 10*b*-29 for separately selecting an SIM card (an interface), which are not listed one by one herein. This is not limited in this application.

Still referring to FIG. 11, for example, when the user clicks 10*b*-21, the mobile phone 100 selects all options displayed in the list 10*b*-2 in response to the operation behavior of the user. When the user then clicks 10*b*-4, the MCU 201 of the control circuit 200 transmits the control signal to the short circuit elements corresponding to 10*b*-22 to 10*b*-29 through GPIO pins corresponding to 10*b*-22 to 10*b*-29, so that the short circuit of the hardware 10*b*-22 to 10*b*-29 is implemented.

For example, when the user clicks a control corresponding to any hardware in the list 10*b*-2, such as the control 10*b*-22, and when the user then clicks 10*b*-4, the MCU 201 of the control circuit 200 transmits the control signal to the short circuit element corresponding to 10*b*-22 through the GPIO pin corresponding to 10*b*-22, so that the short circuit of 10*b*-22 is implemented.

In other words, after the user clicks 10*b*-4, the MCU 201 is controlled to transmit the first control signal, and then the selected input/output unit is controlled to be short-circuited through the corresponding short circuit element 202.

In addition, it should be further noted that, in some other implementations, the hardware security protection mode may be further determined to be enabled to implement the short circuit of a set input/output unit based on a quantity of times (for example, 3 times) of tapping on a screen, a rear housing, or a side frame of the mobile phone 100 by using a knuckle/finger/stylus within a set time (for example, 2 s). For this manner, the short-circuited input/output units may be all or set by default. This is not limited herein.

In addition, it should be further noted that, in some other implementations, the hardware security protection mode may be further determined to be enabled to implement the short circuit of a set input/output unit based on a graphic drawn on any region or a specific region of a screen of the mobile phone 100, for example, a triangle drawn on any region of a screen of the mobile phone 100, by using a knuckle/finger/stylus. Similarly, for this manner, the short-circuited input/output units may be all or set by default. This is not limited herein.

It should be understood that, the foregoing description is only an example for better understanding of the technical solutions of this embodiment, and is not a unique limitation on this embodiment.

In addition, it should be further noted that, based on the foregoing, when the security protection APK triggers the control circuit 200 to exit the working mode, the user may click on the security protection APK displayed on the display page shown in FIG. 9. In this case, the mobile phone 100 starts the security protection APK in response to the operation behavior of the user, and the display page displays the page 10*a* of whether to enable the hardware security protection mode as shown in FIG. 10. Then, the user clicks the control 10*a*-3 displayed on the page 10*a*, and the mobile phone 100 controls the switch element 203 to be at an on position in response to the operation behavior of the user. In this case, the control circuit 200 may exit the working mode, and all short-circuited input/output units 204 may be restored for normal use.

Correspondingly, the control circuit 200 may exit the working mode based on a quantity of times (for example, 3 times) of tapping on a screen, or a rear housing, or a side frame of the mobile phone 100 based on a specific gesture, or a knuckle/finger/stylus within a set time (for example, 2 s), or based on a graphic drawn on any region or a specific region of a screen of the mobile phone 100, for example, a square drawn on any region of a screen of the mobile phone 100, by using a knuckle/finger/stylus.

It should be understood that, the foregoing description is only an example for better understanding of the technical solutions of this embodiment, and is not a unique limitation on this embodiment.

In addition, it should be further noted that, in some implementations, a manner of triggering the control circuit 200 to enter the working mode and exit the working mode through a combination of the mechanical button and the hardware. For this manner, the GND pin of the MCU 201 implements grounding still by using the switch element acted as the mechanical button, that is, when the control circuit 200 exits the working mode, the GND pin is not grounded. When the user implements grounding through the mechanical button, the control circuit 200 may be directly triggered to enter the working mode, that is, all input/output units 204 that can currently be short-circuited are short-circuited, and then some input/output units 204 can be selectively restored for available through software and based on individual requirements.

For the implementation of triggering the control circuit 200 to enter the working mode through the mechanical button, reference may be made to the description of the foregoing embodiments, and details are not described herein again.

Correspondingly, for the implementation of selectively restoring some input/output units 204 for available, reference may be made to the description of the foregoing embodiments, and details are not described herein again.

In addition, for the manner of combining the mechanical button and the software, when the control circuit 200 is triggered to exit the working mode, the mechanical button may be directly used, or the software may be used. For the implementation of triggering the control circuit 200 to exit the working mode through the mechanical button or the hardware, reference may be made to the description of the foregoing embodiments, and details are not described herein again.

Figure 12:
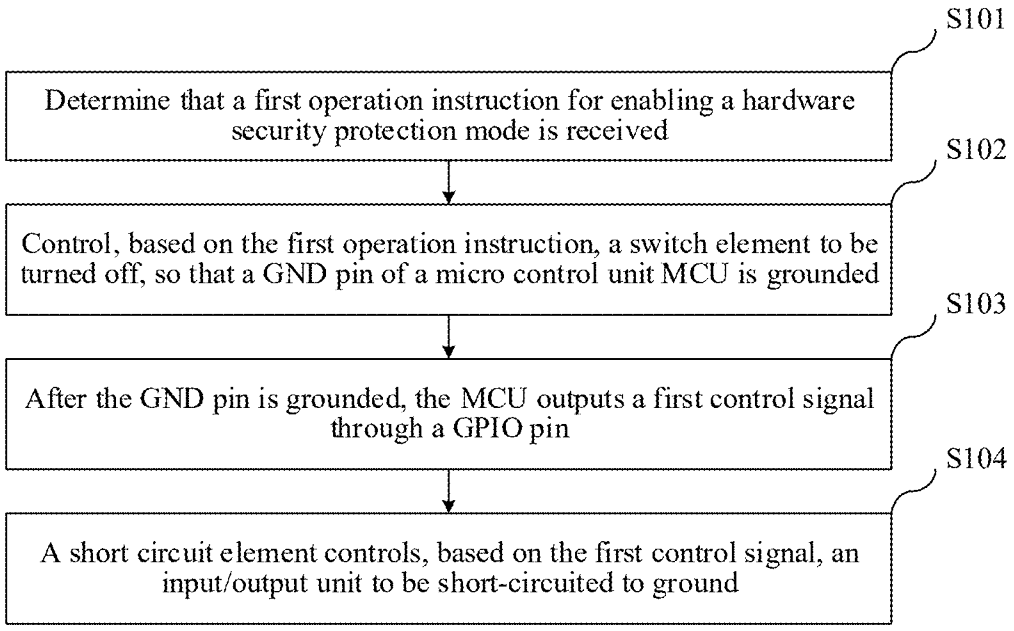
FIG. 12 is a flowchart of a hardware security protection method according to an embodiment of this application.

For an electronic device integrated with the foregoing control circuit, this application further provides a hardware security protection method applied to the electronic device. Referring to FIG. 12, a specific procedure of the hardware security protection method provided in this embodiment includes the following steps:

S101: Determine that a first operation instruction for enabling a hardware security protection mode is received.

For example, in a feasible implementation, the determining that a first operation instruction for enabling a hardware security protection mode is received, for example, may include:

monitoring an on/off state corresponding to a first mechanical button; and when the on/off state is a first state, determining that a first operation instruction for triggering to enable the hardware security protection mode is received, where the first state is used for indicating that the first mechanical button is currently at an off position.

It may be understood that, in some implementations, the foregoing first mechanical button may be, for example, the foregoing switch. For the description of determining whether to enable the hardware security protection mode based on an on/off state of the switch, reference may be made to the foregoing descriptions, and details are not described herein again.

For example, in another feasible implementation, the determining that a first operation instruction for enabling a hardware security protection mode is received, for example, may include:

- recording, when a first press operation on a second mechanical button is detected, first press duration on the second mechanical button; and
- determining, when the first press duration matches a first time threshold, that the first operation instruction for enabling the hardware security protection mode is received.

It may be understood that, in some implementations, the foregoing second mechanical button may be, for example, the foregoing volume up button or volume down button.

In addition, it should be noted that, the first press operation and the first press duration specifically indicate a press operation and press duration for the second mechanical button when the hardware security protection mode is disabled. For the description of determining whether to enable the hardware security protection mode based on press duration of the volume up button or the volume down button, reference may be made to the foregoing descriptions, and details are not described herein again.

For example, in another feasible implementation, the determining that a first operation instruction for enabling a hardware security protection mode is received, for example, may include:

- recording, when a third press operation on a second mechanical button is detected, a quantity of times of first press on the second mechanical button within a set time; and
- determining, when the quantity of times of first press matches a first quantity of times threshold, that the first operation instruction for enabling the hardware security protection mode is received.

It may be understood that, in some implementations, the foregoing second mechanical button may be, for example, the foregoing volume up button or volume down button.

In addition, it should be noted that, the third press operation and the quantity of times of first press specifically indicate a press operation and a quantity of times of pressing for the second mechanical button when the hardware security protection mode is disabled. For the description of determining whether to enable the hardware security protection mode based on a quantity of times of pressing on the volume up button or the volume down button, reference may be made to the foregoing descriptions, and details are not described herein again.

In addition, it should be noted that, in an actual application, in a manner of using the second mechanical button to enable or disable the hardware security protection mode, the GND pin of the MCU 201 in the corresponding control circuit 200 may be grounded or disconnected through the second mechanical button. In this case, it is determined that when the first operation instruction for enabling the hardware security protection mode is received by monitoring the press duration or the quantity of times of pressing of the second mechanical button, an operation needs to be performed is that the GND pin of the MCU 201 is grounded through the second mechanical button, and the following step S103 is directly performed after grounding. Correspondingly, it is determined that when the second operation instruction for disabling the hardware security protection mode is received by monitoring the press duration or the quantity of times of pressing of the second mechanical button, an operation needs to be performed is that the GND pin of the MCU 201 is not grounded, and the input/output unit in the failure state is restored to the available state.

For example, in another feasible implementation, in a manner of using the second mechanical button to enable or disable the hardware security protection mode, the GND pin of the MCU 201 in the corresponding control circuit 200 may always be grounded. In this case, it is determined that when the first operation instruction for enabling the hardware security protection mode is received by monitoring the press duration or the quantity of times of pressing of the second mechanical button, an operation needs to be performed is that the following step S103 is directly performed. Correspondingly, it is determined that when the second operation instruction for disabling the hardware security protection mode is received by monitoring the press duration or the quantity of times of pressing of the second mechanical button, an operation needs to be performed is that a control signal is transmitted to restore the available state of the input/output unit to the short circuit element, so that the input/output unit in the failure state is restored to the available state.

It should be understood that, the foregoing description is only an example for better understanding of the technical solutions of this embodiment, and is not a unique limitation on this embodiment.

For example, in another feasible implementation, an application program for enabling a hardware security protection mode is installed in the electronic device, the application program provides a first control for enabling the hardware security protection mode and a second control for disabling the hardware security protection mode.

Correspondingly, determining that a first operation instruction for enabling a hardware security protection mode is received, for example, may include:

the determining that a first operation instruction for enabling a hardware security protection mode is received includes:

determining, when a click operation on the first control is detected, that a first operation instruction for enabling the hardware security protection mode is received.

It may be understood that, the foregoing first control may be, for example, the foregoing control 10*a*-2. For the description of enabling the hardware security protection mode based on a click operation of the control 10*a*-2, reference may be made to the foregoing descriptions, and details are not described herein again.

S102: Control a switch element to be turned off based on the first operation instruction, so that a GND pin of a micro control unit MCU is grounded.

For example, in a feasible implementation, after the controlling a switch element to be turned off based on the first operation instruction, so that a GND pin of a micro control unit MCU is grounded, for example, the method may further include:

- determining, when an on/off state of the first mechanical button changes from a first state to a second state, that a second operation instruction for disabling the hardware security protection mode is received.

It may be understood that, in this embodiment, the second state is used for indicating that the first mechanical button is currently at an on position, and the second operation instruction is used for controlling the switch element to be turned on, so that the GND pin is not grounded and the hardware security protection mode is disabled. For the description of determining whether to disable the hardware security protection mode based on an on/off state of the switch, reference may be made to the foregoing descriptions, and details are not described herein again.

For example, in another feasible implementation, after the controlling a switch element to be turned off based on the first operation instruction, so that a GND pin of a micro control unit MCU is grounded, for example, the method may further include:

- recording, when a second press operation on the second mechanical button is detected, second press duration on the second mechanical button; and
- determining, when the second press duration matches a second time threshold, that a second operation instruction for disabling the hardware security protection mode is received.

It should be noted that, the second press operation and the second press duration specifically indicate a press operation and press duration for the second mechanical button when the hardware security protection mode is enabled. For the description of determining whether to disable the hardware security protection mode based on press duration of the volume up button or the volume down button, reference may be made to the foregoing descriptions, and details are not described herein again.

For example, in another feasible implementation, after the controlling a switch element to be turned off based on the first operation instruction, so that a GND pin of a micro control unit MCU is grounded, for example, the method may further include:

- recording, when a fourth press operation on the second mechanical button is detected, the quantity of times of first press on the second mechanical button within the set time; and
- determining, when a quantity of times of second press matches a second quantity of times threshold, that a second operation instruction for disabling the hardware security protection mode is received.

It should be noted that, the fourth press operation and the quantity of times of second press specifically indicate a press operation and a quantity of times of pressing for the second mechanical button when the hardware security protection mode is enabled. For the description of determining whether to disable the hardware security protection mode based on a quantity of times of pressing on the volume up button or the volume down button, reference may be made to the foregoing descriptions, and details are not described herein again.

For example, in another feasible implementation, after the controlling a switch element to be turned off based on the first operation instruction, so that a GND pin of a micro control unit MCU is grounded, for example, the method may further include:

determining, when a click operation on a second control is detected, that a second operation instruction for disabling the hardware security protection mode is received.

It may be understood that, the foregoing second control may be, for example, the foregoing control 10*a*-2. For the description of disabling the hardware security protection mode based on a click operation of the control 10*a*-3, reference may be made to the foregoing descriptions, and details are not described herein again.

S103: After the GND pin is grounded, the MCU outputs a first control signal through a GPIO pin.

S104: A short circuit element controls, based on the first control signal, an input/output unit to be short-circuited to ground.

For example, in a feasible implementation, after the short circuit element controls, based on the first control signal, the input/output unit to be short-circuited to ground, for example, the method may further include:

obtaining, by a processing unit CPU when receiving an access request to access the input/output unit, description information of an application program that accesses the input/output unit, where the description information is used for determining whether the application program is a system application;

sending, by the CPU, a second control signal to the MCU through an I2C bus when it is determined, based on the description information, that the application program is the system application;

outputting, by the MCU after receiving the second control signal, a third control signal through the GPIO pin; and controlling, by the short circuit element based on the third control signal, the input/output unit to be turned on.

Therefore, the MCU can determine which failed input/output units should be restored for normal use based on the second control signal transmitted by the CPU, thereby ensuring normal use of the input/output units by the user.

Since the hardware security protection method provided in this embodiment is implemented based on the foregoing control circuit, for parts that is not explained in detail in this embodiment, refer to the foregoing description and details are not described herein again.

In addition, it should be understood that to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or computer software driving hardware depends on particular applications and design constraints of the technical solutions. A person skilled in the art may use different methods to implement the described functions for each particular application with reference to embodiments, but it should not be considered that the implementation goes beyond the scope of this application.

In addition, it should be noted that, in an actual application scenario, the hardware security protection method provided in the foregoing embodiments implemented by the electronic device may also be performed by a chip system included in the electronic device, where the chip system may include a processor. The chip system may be coupled with a memory, so that when the chip system is running, the computer program stored in the memory is called to implement the steps performed by the electronic device. The processor in the chip system may be an application processor or a non-application processor.

In addition, an embodiment of this application further provides a computer-readable storage medium. The computer-readable storage medium stores computer instructions. The computer instructions, when run on an electronic device, cause the electronic device to perform steps of the foregoing relevant methods to implement the hardware security protection method in the foregoing embodiments.

In addition, an embodiment of this application further provides a computer program product. The computer program product, when run on an electronic device, cause the electronic device to perform the foregoing relevant steps, to implement the hardware security protection method in the foregoing embodiments.

In addition, an embodiment of this application further provides a chip (or may be a component or a module). The chip may include one or more processing circuits and one or more transceiver pins. The transceiver pin and the processing circuit communicate with each other through an internal connection path. The processing circuit performs perform steps of the foregoing relevant methods to implement the hardware security protection method in the foregoing embodiment, to control a receive pin to receive a signal and to control a transmit pin to transmit the signal.

In addition, it can be learned from the foregoing description that, the electronic device, the computer-readable storage medium, the computer program product, or the chip provided in the embodiments of this application may be configured to perform the corresponding method provided above. Therefore, for beneficial effects that can be achieved, refer to the beneficial effects of the corresponding method provided above. Details are not described herein again.

It should be understood that, the foregoing description is only an example for better understanding of the technical solutions of this embodiment, and is not a unique limitation on this embodiment. Although this application is described in detail with reference to the foregoing embodiments, it should be appreciated by a person skilled in the art that, modifications may still be made to the technical solutions described in the foregoing embodiments, or equivalent replacements may be made to the part of the technical features; and as long as such modifications or replacements do not cause the essence of corresponding technical solutions to depart from the scope of the technical solutions of embodiments of this application.

The invention claimed is:

1. A control circuit, comprising: a micro control unit (MCU), a short circuit element, a switch element, wherein a Voltage Common Collector (VCC) pin of the MCU is connected to a power supply voltage VCC, a general purpose input/output (GPIO) pin of the MCU is connected to an input end of the short circuit element, a ground (GND) pin of the MCU is grounded through the switch element, and an output end of the short circuit element is configured to connected to a signal receiving end of an input/output unit;

the MCU is configured to output a first control signal through the GPIO pin after the GND pin is grounded through the switch element; and the short circuit element is configured to control, based on the first control signal, the input/output unit to be short-circuited to ground.

2. The control circuit according to claim 1, wherein the control circuit further comprises a processing unit (CPU), wherein the CPU communicates with the MCU through an Inter-Integrated Circuit (I2C) bus; and the MCU is further configured to output a third control signal through the GPIO pin after receiving a second control signal transmitted by the CPU through the 12C bus; and the short circuit element is further configured to control, based on the third control signal, the input/output unit to be turned on.

3. The control circuit according to claim 2, wherein a clock signal port of the CPU is connected to the signal receiving end of the input/output unit, wherein after the input/output unit is turned on, the input/output unit receives a clock signal transmitted by the CPU through the clock signal port and responds to the clock signal.

4. The control circuit according to claim 1, wherein the input/output unit comprises any one or more of the following:

a camera unit, a microphone unit, a storage unit, and a sensor unit.

5. The control circuit according to claim 4, wherein a quantity of the short circuit elements and a quantity of the input/output units are the same and in a one-to-one correspondence.

6. The control circuit according to claim 5, wherein one GPIO pin of the MCU is respectively connected to an input end of each short circuit element.

7. The control circuit according to claim 5, wherein a quantity of the GPIO pins of the MCU and a quantity of the short circuit elements are the same and in a one-to-one correspondence.

8. The control circuit according to claim 4, wherein when the input/output unit comprises the microphone unit, the control circuit further comprises: a codec, wherein a positive input end of the codec is connected to a positive output end of the microphone unit, a negative input end of the codec is connected to a negative output end of the microphone unit, and a positive input end of the microphone unit is a signal receiving end and is connected to the output end of the short circuit element.

9. The control circuit according to claim 1, wherein the short circuit element is a metal-oxide-semiconductor field-effect transistor (MOSFET).

10. The control circuit according to claim 9, wherein the MOSFET transistor is an n-channel MOSFET (NMOS) transistor, wherein a gate of the NMOS transistor is grounded, a drain of the NMOS transistor is an input end and is connected to the GPIO pin of the MCU, and a source of the NMOS transistor is an output end and is configured to connect to the signal receiving end of the input/output unit; and when the MOSFET transistor is the NMOS transistor, the first control signal is a high-level signal, and the NMOS transistor is turned on in response to the high-level signal, so that the input/output unit is short-circuited to ground.

11. The control circuit according to claim 9, wherein the MOSFET transistor is a p-channel MOSFET (PMOS) transistor, wherein a gate of the PMOS transistor is grounded, a source of the PMOS transistor is an input end and is connected to the GPIO pin of the MCU, and a drain of the PMOS transistor is an output end and is configured to connect to the signal receiving end of the input/output unit; and when the MOSFET transistor is the PMOS transistor, the first control signal is a low-level signal, and the PMOS transistor is turned on in response to the low-level signal, so that the input/output unit is short-circuited to ground.

12. An electronic device, comprising: a micro control unit (MCU), a short circuit element, a switch element, and an input/output unit, wherein a Voltage Common Collector (VCC) pin of the MCU is connected to a power supply voltage VCC, a general purpose input/output (GPIO) pin of the MCU is connected to an input end of the short circuit element, a ground (GND) pin of the MCU is grounded through the switch element, and an output end of the short circuit element is connected to a signal receiving end of the input/output unit;

the MCU is configured to output a first control signal through the GPIO pin after the GND pin is grounded through the switch element; and the short circuit element is configured to control, based on the first control signal, the input/output unit to be short-circuited to ground.

13. A hardware security protection method, applied to the electronic device according to claim 12, and the method comprising:

determining that a first operation instruction for enabling a hardware security protection mode is received;

controlling, based on the first operation instruction, the switch element to be turned off, so that the GND pin of the micro control unit MCU is grounded;

after the GND pin is grounded, outputting, by the MCU, a first control signal through the GPIO pin; and controlling, by the short circuit element based on the first control signal, the input/output unit to be short-circuited to ground.

14. The method according to claim 13, wherein the determining that a first operation instruction for enabling a hardware security protection mode is received comprises:

monitoring an on/off state corresponding to a first mechanical button; and when the on/off state is a first state, determining that a first operation instruction for triggering to enable the hardware security protection mode is received, wherein the first state is used for indicating that the first mechanical button is currently at an off position.

15. The method according to claim 14, wherein after the controlling, based on the first operation instruction, the switch element to be turned off, so that the GND pin of the micro control unit MCU is grounded, the method further comprises:

when the on/off state changes from the first state to a second state, determining that a second operation instruction for disabling the hardware security protection mode is received, wherein the second state is used for indicating that the first mechanical button is currently at an on position, and the second operation instruction is used for controlling the switch element to be turned on, so that the GND pin is not grounded, and the hardware security protection mode is disabled.

16. The method according to claim 13, wherein the determining that a first operation instruction for enabling a hardware security protection mode is received comprises:

recording, when a first press operation on a second mechanical button is detected, first press duration on the second mechanical button; and determining, when the first press duration matches a first time threshold, that the first operation instruction for enabling the hardware security protection mode is received.

17. The method according to claim 16, wherein after the controlling, based on the first operation instruction, the switch element to be turned off, so that the GND pin of the micro control unit MCU is grounded, the method further comprises:

recording, when a second press operation on the second mechanical button is detected, second press duration on the second mechanical button; and determining, when the second press duration matches a second time threshold, that a second operation instruction for disabling the hardware security protection mode is received, wherein the second operation instruction is used for controlling the switch element to be turned on, so that the GND pin is not grounded and the hardware security protection mode is disabled.

18. The method according to claim 13, wherein the determining that a first operation instruction for enabling a hardware security protection mode is received comprises:

recording, when a third press operation on a second mechanical button is detected, a quantity of times of first press on the second mechanical button within a set time; and determining, when the quantity of times of first press matches a first quantity of times threshold, that the first operation instruction for enabling the hardware security protection mode is received.

19. The method according to claim 18, wherein after the controlling, based on the first operation instruction, the switch element to be turned off, so that the GND pin of the micro control unit MCU is grounded, the method further comprises:

recording, when a fourth press operation on the second mechanical button is detected, the quantity of times of first press on the second mechanical button within the set time; and determining, when a quantity of times of second press matches a second quantity of times threshold, that a second operation instruction for disabling the hardware security protection mode is received, wherein the second operation instruction is used for controlling the switch element to be turned on, so that the GND pin is not grounded and the hardware security protection mode is disabled.

20. The method according to claim 13, wherein after the controlling, by a short circuit element based on the first control signal, an input/output unit to be short-circuited to ground, the method further comprises:

obtaining, by a processing unit (CPU) when receiving an access request to access the input/output unit, description information of an application program that accesses the input/output unit, wherein the description information is used for determining whether the application program is a system application;

sending, by the CPU, a second control signal to the MCU through an Inter-Integrated Circuit (I2C) bus when it is determined, based on the description information, that the application program is the system application;

outputting, by the MCU after receiving the second control signal, a third control signal through the GPIO pin; and controlling, by the short circuit element based on the third control signal, the input/output unit to be turned on.

* * * * *